(12) United States Patent (10) Patent No.: US 9,030,298 B2
Yamazaki et al. (45) Date of Patent: May 12, 2015

(54) THIN SEMICONDUCTOR DEVICE AND OPERATION METHOD OF THIN SEMICONDUCTOR DEVICE

(75) Inventors: Shunpei Yamazaki, Setagaya (JP); Takeshi Osada, Isehara (JP); Yasuyuki Arai, Atsugi (JP); Yuko Tachimura, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 13/424,737

(22) Filed: Mar. 20, 2012

(65) Prior Publication Data

US 2012/0175753 A1 Jul. 12, 2012

Related U.S. Application Data

(63) Continuation of application No. 10/592,371, filed as application No. PCT/JP2005/006214 on Mar. 24, 2005, now abandoned.

(30) Foreign Application Priority Data

Mar. 26, 2004 (JP) ................. 2004-092972

(51) Int. Cl.
*G06K 9/00* (2006.01)
*H01L 23/66* (2006.01)
(Continued)

(52) U.S. Cl.
CPC ............ *G06K 19/072* (2013.01); *G06K 7/0008* (2013.01); *G06K 19/0723* (2013.01); *G06K 19/07718* (2013.01); *G06K 19/07749* (2013.01)

(58) Field of Classification Search
CPC .................................. G06K 9/00; H01L 23/66
USPC ............................................. 340/10.1; 3/10.1
See application file for complete search history.

(56) References Cited

U.S. PATENT DOCUMENTS 5,175,840 A 12/1992 Sawase et al.
5,602,556 A * 2/1997 Bowers .................... 343/742
(Continued)

FOREIGN PATENT DOCUMENTS

EP 0 590 331 A 4/1994
JP 62-078643 4/1987
(Continued)

OTHER PUBLICATIONS

International Search Report (Application No. PCT/JP2005/006214) dated May 17, 2005.
(Continued)

*Primary Examiner* — Brian Zimmerman
*Assistant Examiner* — Cal Eustaquio
(74) *Attorney, Agent, or Firm* — Eric J. Robinson; Robinson Intellectual Property Law Office, P.C.

(57) ABSTRACT

The present invention provides a thin semiconductor device in which its security such as prevention of counterfeit or information leakage is to be enhanced. One feature of the present invention is a thin semiconductor device in which a plurality of thin film integrated circuits are mounted and in which at least one integrated circuit is different from the other integrated circuits in any one of a specification, layout, frequency for transmission or reception, a memory, a communication means, a communication rule and the like. According to the present invention, a thin semiconductor device tag having the plurality of thin film integrated circuits communicates with a reader/writer and at least one of the thin film integrated circuits receives a signal to write information in a memory, and the information written in the memory determines which of the thin film integrated circuits communicates.

5 Claims, 19 Drawing Sheets

(51) Int. Cl.
*G06K 19/07* (2006.01)
*G06K 7/00* (2006.01)
*G06K 19/077* (2006.01)

(56) References Cited

U.S. PATENT DOCUMENTS

| | | |
|---|---|---|
| 5,684,899 A | 11/1997 | Ota |
| 5,854,700 A | 12/1998 | Ota |
| 5,915,054 A | 6/1999 | Ota |
| 6,100,804 A * | 8/2000 | Brady et al. ............... 340/572.7 |
| 6,104,311 A * | 8/2000 | Lastinger ................... 340/10.51 |
| 7,501,954 B1 * | 3/2009 | Chung ....................... 340/572.7 |
| 2001/0010495 A1 | 8/2001 | Helms et al. |
| 2002/0005774 A1 | 1/2002 | Rudolph et al. |
| 2002/0011677 A1 * | 1/2002 | Yokoi et al. ................... 257/782 |
| 2002/0094639 A1 | 7/2002 | Reddy |
| 2002/0097153 A1 * | 7/2002 | Youbok et al. ............. 340/572.5 |
| 2002/0110934 A1 | 8/2002 | Uchiyama et al. |
| 2003/0220711 A1 | 11/2003 | Allen |
| 2004/0074975 A1 * | 4/2004 | Gundlach et al. ............. 235/492 |
| 2004/0085191 A1 | 5/2004 | Horwitz et al. |
| 2004/0112964 A1 | 6/2004 | Empedocles et al. |
| 2005/0030201 A1 * | 2/2005 | Bridgelall ................. 340/870.11 |
| 2006/0043199 A1 * | 3/2006 | Baba et al. .................... 235/492 |
| 2006/0073667 A1 | 4/2006 | Li et al. |
| 2006/0109085 A1 | 5/2006 | Tiernay et al. |

FOREIGN PATENT DOCUMENTS

| | | |
|---|---|---|
| JP | 03-200446 A | 9/1991 |
| JP | 05-252170 A | 9/1993 |
| JP | 08-044831 | 2/1996 |
| JP | 08-088363 | 4/1996 |
| JP | 08-185487 | 7/1996 |
| JP | 10-079471 | 3/1998 |
| JP | 10-095189 | 4/1998 |
| JP | 11-054755 | 2/1999 |
| JP | 11-328344 | 11/1999 |
| JP | 2000-020665 | 1/2000 |
| JP | 2001-101370 | 4/2001 |
| JP | 2001-109861 | 4/2001 |
| JP | 2001-109862 | 4/2001 |
| JP | 2001-312701 A | 11/2001 |
| JP | 2002-183698 A | 6/2002 |
| JP | 2002-259927 | 9/2002 |
| JP | 2002-319003 A | 10/2002 |
| JP | 2003-331238 | 11/2003 |
| JP | 2004-031536 A | 1/2004 |
| JP | 2004-078834 | 3/2004 |
| JP | 2004-227081 | 8/2004 |

OTHER PUBLICATIONS

Written Opinion (Application No. PCT/JP2005/006214) dated May 17, 2005.

* cited by examiner

FIG. 3

| state | | writing | | reading | | key information |
|---|---|---|---|---|---|---|
| | communication | 1st memory | 2nd memory | 1st memory | 2nd memory | |
| 1st thin film integrated circuit | communication | allowed | not allowed | allowed | allowed | 0100 |
| 2nd thin film integrated circuit | — | | | | | |
| 3rd thin film integrated circuit | — | | | | | |
| 1st thin film integrated circuit | — | not allowed | allowed | not allowed | allowed | 1010 |
| 2nd thin film integrated circuit | communication | | | | | |
| 3rd thin film integrated circuit | — | | | | | |
| 1st thin film integrated circuit | * | not allowed | allowed | allowed | allowed | 1000 |
| 2nd thin film integrated circuit | communication | | | | | |
| 3rd thin film integrated circuit | — | | | | | |
| 1st thin film integrated circuit | * | allowed | not allowed | allowed | not allowed | 0101 |
| 2nd thin film integrated circuit | * | | | | | |
| 3rd thin film integrated circuit | — | | | | | |
| 1st thin film integrated circuit | * | not allowed | not allowed | not allowed | not allowed | 1111 |
| 2nd thin film integrated circuit | * | | | | | |
| 3rd thin film integrated circuit | communication | | | | | |

—: a state that transmission/reception is not conducted
*: a state that transmission to/reception from a thin film integrated circuit is

FIG. 6A

|  | frequency | protocol | key information |
|---|---|---|---|
| 1st reception mode | f1 | P1 | 01 |
| 2nd reception mode | f2 | P2 | 10 |

FIG. 6B

| key information | memory | |
|---|---|---|
|  | reading | writing |
| 00 (initial state) | allowed | allowed |
| 01 | allowed | not allowed |
| 10 | not allowed | allowed |
| 11 | not allowed | not allowed |

| key information | (1) | (2) | (3) | (4) |
|---|---|---|---|---|
| 0 0 0 0 (initial value) | — | — | — | — |
| 0 0 0 1 | ○ | × | × | × |
| 0 0 1 1 | × | ○ | × | × |
| 0 1 1 1 | × | × | ○ | × |
| 1 1 1 1 | × | × | × | ○ |

THIN SEMICONDUCTOR DEVICE AND OPERATION METHOD OF THIN SEMICONDUCTOR DEVICE

TECHNICAL FIELD

The present invention relates to a thin semiconductor device in which a thin film integrated circuit is mounted and an operation method of the thin semiconductor device.

BACKGROUND ART

As for a conventional non-contact IC card, there is proposed a structure in which capacity adjustment of a capacitor for setting the resonance frequency of a resonant circuit in an antenna mechanism is not required, mechanical damages to elements constituting a card are minimalized, and mass-productivity is increased. The structure has a plane coil which is connected to a non-contact IC chip and plural other plane coils which are arranged in the periphery thereof (Reference 1: Japanese Patent Laid-Open No. 2001-109861 and Reference 2: Japanese Patent Laid-Open No. 2001-109862). According to References 1 and 2, each of resonance frequencies is a frequency of high frequency electromagnetic field from a reader/writer device, a frequency shifted up/down to some extent, or the like, and several of the frequencies can be combined so as not to be interfered with one another, thereby obtaining broadband resonance properties.

There is an IC card in which a plurality of IC chips each using the same frequency and a booster coil are mounted on a base material of a card so as to expand a function of an IC card (Reference 3: Japanese Patent Laid Open No. 2003-331238). According to Reference 3, the IC chips use the booster coil as a common external antenna and thus, can individually conduct data communication with an external reader/writer.

DISCLOSURE OF INVENTION

As for such conventional IC cards according to References 1 to 3, preventing counterfeit of such cards has been not considered. No measures for preventing information leakage have been made.

It is an object of the present invention to provide a thin semiconductor device whose security for prevention of counterfeit or information leakage is to be enhanced.

The present invention has been made in view of the above described problems. One feature of the present invention is a thin semiconductor device in which a plurality of thin film integrated circuits are mounted and in which at least one integrated circuit is different from the other integrated circuits in any one of specification, layout, frequency for transmission or reception (referred to as transmission/reception collectively) (simply referred to as frequency), memory, communication means, communication rule and the like.

The layout of the thin film integrated circuit includes layouts of a central processing unit (CPU), a memory, an antenna and the like. Differences in the layouts of antennas means difference in shapes or lengths of antennas. Difference in the shapes or lengths of antennas causes difference in frequencies. This frequency can adopt any of a sub millimeter wave (300 GHz to 3 THz), an extremely-high-frequency wave (EHF) (30 GHz to 300 GHz), a super-high-frequency wave (SHF) (3 GHz to 30 GHz), an ultra-high-frequency wave (UHF) (300 MHz to 3 GHz), a very-high-frequency (VHF) (30 MHz to 300 MHz), a high-frequency wave (HF) (3 MHz to 30 MHz), a medium-frequency wave (MF) (300 KHz to 3 MHz), a long-frequency wave (LF) (30 KHz to 300 KHz) and a very-long frequency wave (VLF) (3 KHz to 30 KHz). The specific frequency can adopt any of 135 KHz, 6.78 MHz, 13.56 MHz, 27.125 MHz, 40.68 MHz, 433.92 MHz, 869.0 MHz, 915.0 MHz, 2.45 GHz, 5.8 GHz and 24.125 GHz. If the frequencies are, for example, 2.45 GHz and 900 MHz, the shapes of antennas are different. In other words, the antenna may be a dipole type one or a loop type one.

The memory may adopt either a memory that can store information even when the power is off, or a memory that cannot store information when the power is off. The memories that can store information even when the power is off include a nonvolatile memory, a ROM (such as mask ROM), a flash memory, an FRAM, an EPROM, and an EEPROM. The memories that cannot store information when the power is off include a DRAM and an SRAM. In such memories, information can be written in or reading when a signal is input. The signal includes a signal for selecting a memory to be reading, i.e., a selection signal, in addition to the signal for writing to information. According to the present invention, when these memories are different, information memorized in the memories are different in some cases. Differences in information means that memorizing modes of a memory such as rewritable, erasable and overwritable of information are different.

Differences in communication means of thin film integrated circuits means to adopt either a digital modulation system or an analog modulation system. The digital modulation system is any of amplitude shift keying (ASK), frequency shift keying (FSK) and phase shift keying (PSK). The analog modulation system is any of amplitude modulation (AM), frequency modulation (FM) and phase modulation (PM).

The communication means can adopt either one-way communication or two-way communication. Further, it can adopt any of a space division multiplex access method (SDMA), a polarization division multiplex access method (PDMA), a frequency-division multiplex access method (FDMA), a time-division multiplex access method (TDMA), a code division multiplex access method (CDMA) and an orthogonal frequency division multiplexing method (OFDM).

Differences in communication rules, i.g., protocols, of integrated circuits means that predetermined rules for conducting data communication are different. When the protocols are different, processing rules of central processing units (CPUs) formed in the thin film integrated circuits are different.

As for the operation method of the above described thin semiconductor device, a reader/writer communicates with plural thin film integrated circuits, information is written in a memory by transmitting a signal to at least one of the plurality of thin film integrated circuits, and it is determined which of the plurality of thin film integrated circuits communicates by the information written in the memory.

As described above, by the communication mode of the thin film integrated circuit and the reader/writer, it is possible to determine which of thin film integrated circuits is communicated with. Therefore, access to the memory can be limited.

According to the present invention, a thin semiconductor device in which a thin film integrated circuit is mounted includes an ID card typified by a credit card, an ID tag used for merchandise management, and an ID chip mounted on an article.

According to the present invention, the security of a thin semiconductor device can be improved. According to the present invention, a new operation method of a thin semiconductor device can be provided. In the operation method of the present invention, the memory can be a nonvolatile memory. Using the nonvolatile memory that can write to only once can prevent falsification. The nonvolatile memory can further enhance the security of a thin semiconductor device.

In the operation method of the present invention, the memory can be a rewritable memory. Thus, the thin film integrated circuit can be reused to contribute to lower cost of thin semiconductor devices.

Since a thin film integrated circuit of the present invention is formed over an insulating substrate, it has fewer limitations on the shape of a mother substrate as compared with an IC chip formed by using a circular silicon wafer. Therefore, mass-productivity of thin film integrated circuits is enhanced and thus thin film integrated circuits can be mass-produced. As the result thereof, cost reduction of thin film integrated circuits can be expected. A thin film integrated circuit formed at extremely low unit cost can generate big profits by the reduction of unit costs.

BRIEF DESCRIPTION OF DRAWINGS

In the accompanying drawings:
FIG. 3 shows key information of a thin semiconductor device;
FIGS. 6A and 6B each show key information of a thin semiconductor device.

BEST MODE FOR CARRYING OUT THE INVENTION

Figure 1:
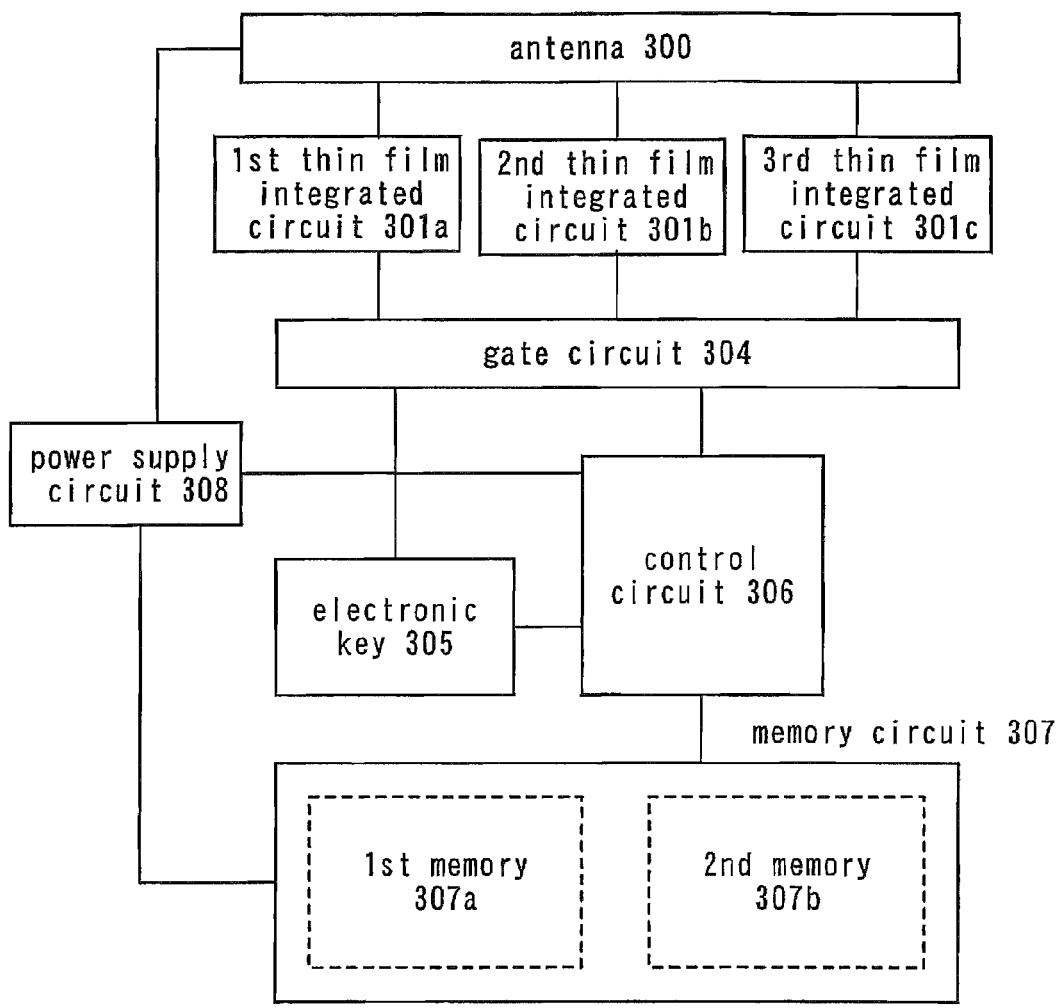
FIG. 1 shows a mode of a thin semiconductor device.

Embodiment Modes according to the present invention will hereinafter be described with reference to the accompanying drawings. The present invention can be carried out in many different modes, and it is easily understood by those skilled in the art that modes and details herein disclosed can be modified in various ways without departing from the spirit and the scope of the present invention. It should be noted that the present invention should not be interpreted as being limited to the description of the embodiment modes to be given below. Note that the same reference numerals are given to the same portions or the portions having the same function in all drawings, and the description thereof is not repeated.

Embodiment Mode 1

Embodiment Mode 1 describes an operation method of a thin semiconductor device in which a plurality of thin film integrated circuits are mounted.

As shown in FIG. 1, in a thin semiconductor device of this embodiment mode, a first thin film integrated circuit 301a, a second thin film integrated circuit 301b and a third thin film integrated circuit 301c that share an antenna 300, are connected to an electronic key 305 and a control circuit 306 through a gate circuit 304. The electronic key 305 may be formed by using a nonvolatile memory. This is because falsification of the electronic key itself and abuse accompanied with it can be prevented. A memory circuit 307 includes a first memory 307a and a second memory 307b, and is connected to the control circuit 306. Note that the first memory 307a and the second memory 307b are shown for convenience; however, a region for forming the memories is not necessarily divided in the actual memory circuit 307. The antenna 300, the control circuit 306, and the memory circuit 307 are each connected to a power supply circuit 308.

Figure 2:
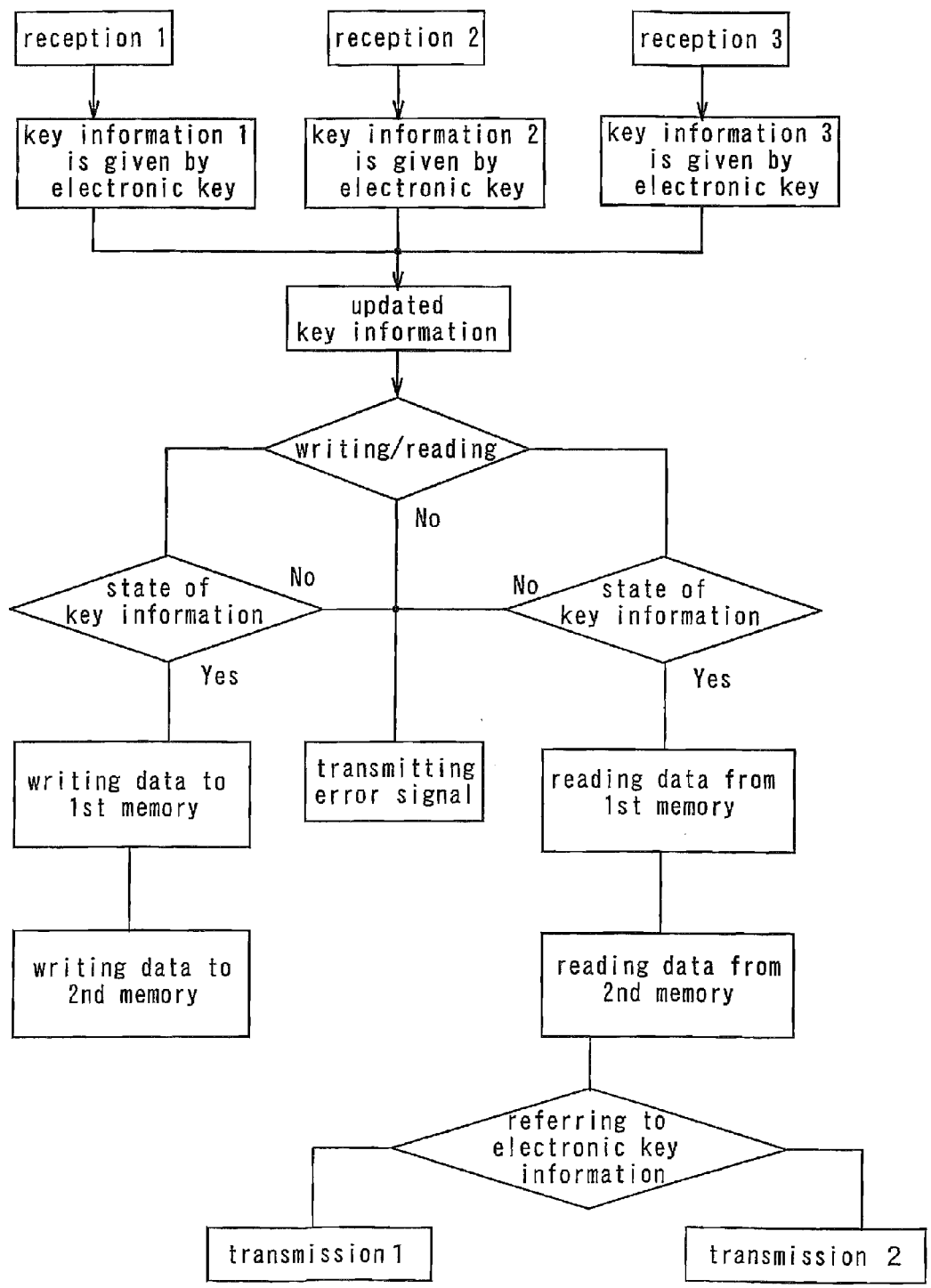
FIG. 2 is a flow chart showing an operation method of a thin semiconductor device.

An operation method of such a thin semiconductor device will be described by using a flow chart. As shown in FIG. 2, a signal is received from an antenna 300, and data (key information) 1 to be an electronic key is given to a first thin film integrated circuit 301a by the electronic key 305 (corresponding to Reception 1). Similarly, a signal is received from the antenna 300, and key information 2 is given to a second thin film integrated circuit 301b by the electronic key 305 (corresponding to Reception 2). Similarly, a signal is received from the antenna 300, and key information 3 is given to a third thin film integrated circuit 301c by the electronic key 305 (corresponding to Reception 3). This key information 1 to 3 can be rewritten, i.e., updated by receiving any key information of the first to third thin film integrated circuits.

Writing or reading information of either the first memory 307a or the second memory 307b can be selected by the key information 1 to 3. Note that reading out information from a memory is referred to as reading, writing information in a memory is referred to as writing, and reading and writing are collectively referred to as access to a memory.

In other words, writing to and reading from the first and second memories can be controlled by the control circuit depending on the state of the key information. In addition, if access to the memory is rejected because of inconsistence with the key information, an error signal may be sent or an error sound may be emitted. Transmission to/reception from the thin film integrated circuit itself may be set to be impossible (not allowed) accompanying with the transmission of the error signal. In addition, when reading from the first or the second memory is conducted, the key information is referred and only when it is consistent, a signal that reading is possible (allowed) is sent.

After reading of the first or the second memory is conducted, information is transmitted to a first thin film integrated circuit 301a, a second thin film integrated circuit 301b, and a third thin film integrated circuit 301c. At this time, the key information is referred to determine which one of the thin film integrated circuits is to receive a signal. In other words, the control circuit controls so that predetermined information is transmitted through the thin film integrated circuit that has received a signal.

Next, key information is described specifically. Whether writing to the first or the second memory or the reading from the first or the second memory is possible or impossible (allowed or not allowed) is controlled by "0" or "1". For example, as shown in FIG. 3, if writing to the second memory is not allowed, the key information is "0100". In addition, if writing to and reading from the first memory are not allowed, the key information is "1010". If writing to the first memory is not allowed, the key information is "1000". If writing to and reading from the second memory are not allowed, the key information is "0101". If writing to and reading from the first and the second memories are rejected, the key information is "1111". The key information in the initial state is "0000". In this way, writing to and reading from the first and the second memories can be controlled. Note that, in FIG. 3, "–" indicates a state that transmission/reception is not conducted, and "*" indicates a state that transmission to/reception from a thin film integrated circuit is prohibited.

Such states are controlled by a signal received by the first to the third thin film integrated circuits. For example, when a reader/writer sends out a signal "0100", only the first thin film integrated circuit receives the signal. Specifically, the reader/writer device may use the communication rule, a unique frequency, or a unique communication means that is unique for the first thin film integrated circuit, to transmit a signal "0100". The unique communication rule can adopt, for example, a unique protocol. The unique frequency can adopt any of a sub millimeter wave (300 GHz to 3 THz), an extremely-high-frequency wave (EHF) (30 GHz to 300 GHz), a super-high-frequency wave (SHF) (3 GHz to 30 GHz), an ultra-high-frequency wave (UHF) (300 MHz to 3 GHz), a very-high-frequency (VHF) (30 MHz to 300 MHz), a high-frequency wave (HF) (3 MHz to 30 MHz), a medium-frequency wave (MF) (300 KHz to 3 MHz), a long frequency wave (LF) (30 KHz to 300 KHz) and a very-long frequency wave (VLF) (3 KHz to 30 KHz). The specific frequency can adopt any of 135 KHz, 6.78 MHz, 13.56 MHz, 27.125 MHz, 40.68 MHz, 433.92 MHz, 869.0 MHz, 915.0 MHz, 2.45 GHz, 5.8 GHz and 24.125 GHz. Further, since the frequency is attributed to the length of an antenna, the length of an antenna of a thin film integrated circuit is set. In addition, a digital modulation system or an analog modulation system can be adopted as the unique communication means. The digital modulation system can be any of amplitude shift keying (ASK), frequency shift keying (FSK) and phase shift keying (PSK). The analog modulation system can be any of amplitude modulation (AM), frequency modulation (FM) and phase modulation (PM). Additionally, the communication means can adopt either one-way communication or two-way communication. Further, it can adopt any of a space division multiplex access method (SDMA), a polarization division multiplex access method (PDMA), a frequency-division multiplex access method (EDMA), a time-division multiplex access method (TDMA), a code division multiplex access method (CDMA) and an orthogonal frequency division multiplexing method (OFDM).

Then, writing to the first memory is conducted. When the writing to the first memory is done, a signal "0100" is transmitted from a reader device and reading from the first memory can be conducted. At the same time, reading from the second memory becomes possible, but no information can reading, since writing to the second memory has not been conducted. In other words, when the first integrated circuit receives the signal "0100", writing to and reading from the first memory only can be conducted.

Next, when the thin semiconductor device receives a signal "1010", only the second thin film integrated circuit receives the signal. Specifically, the reader/writer may use a unique communication rule, a unique frequency, a unique communication means of the second thin film integrated circuit to transmit the signal "1010". These unique frequency, communication means, communication rule can be selected in the same way as transmission to the first thin film integrated circuit.

Then, writing to the first memory is not allowed, and writing to the second memory is allowed. Simultaneously, reading from the first memory is not allowed and reading from the second memory is allowed. In other words, when the second thin film integrated circuit receives a signal "1010"; writing to and reading from the second memory only can be conducted.

Next, when the thin semiconductor device receives a signal "1000", only the second thin film integrated circuit receives the signal. In addition, the first thin film integrated circuit may not be allowed to receive a signal. Specifically, the reader/writer device may use a unique communication rule, a unique frequency, a unique communication means of the second thin film integrated circuit to transmit the signal "1000". These unique frequency, communication means, communication rule can be selected in the same way as transmission to the first thin film integrated circuit.

In this way, the first thin film integrated circuit is not allowed to receive a signal, thereby controlling such that reading from the first memory cannot be conducted. In other words, information of the first memory is not read by a third person. Note that setting is done so that the first memory can be reading by a signal transmitted from a reader/writer of a specific manufacturer such as a manufacturer and seller or a manager of a thin semiconductor device. Consequently, information can be read out by a principal or a specific person in a specific circumstance without being reading by a third person, in general.

Next, when the thin semiconductor device receives a signal "0101", the first thin film integrated circuit receives the signal, and further, it is preferable that the second thin film integrated circuit cannot receive the signal. Specifically, the reader/writer may use a unique communication rule, a unique frequency, a unique communication means of the first thin film integrated circuit to transmit the signal "0101". These unique frequency, communication means, communication rule can be selected as described above.

In this way, the second thin film integrated circuit is not allowed to receive a signal, thereby controlling such that reading from the second memory cannot be conducted. In other words, information of the second memory is not read by a third person. Note that setting is done so that the second memory can be reading by a signal transmitted from a reader/writer of a specific manufacturer such as a seller of a thin semiconductor device. Consequently, information can be read out by a principal or a specific person in a specific circumstance without being reading by a third person, in general.

Next, when the thin semiconductor device receives a signal "1111", a third thin film integrated circuit receives the signal. In addition, the first and the second thin film integrated circuits may not be allowed to receive a signal. Specifically, the reader/writer device may use a unique communication rule, a unique frequency, a unique communication means of the third thin film integrated circuit to transmit the signal "1111". These unique frequency, communication means, communication rule can be selected in the same way as transmission to the first thin film integrated circuit.

In this way, the first and the second thin film integrated circuits are not allowed to receive a signal and thus reading from the first and the second memories cannot be conducted. In other words, information of the first and the second memories is not read by a third person. Note that setting is done so that the first and the second memories can be reading by receiving key information from the third thin film integrated circuit by a signal transmitted from a reader/writer device of a specific manufacturer such as a seller of a thin semiconductor device. Consequently, a principal or a specific person can read information from the first or the second memory.

In this manner, it is possible to control reading from and writing to a memory circuit by making it impossible for a thin film integrated circuit to receive a signal when the thin semiconductor device receives the signal. As the result thereof, the security can be enhanced. Private information may be input into a memory circuit in which reading is limited.

In this embodiment mode, it is preferable to control reception by unique protocols of the first to the third thin film integrated circuits, since an antenna is shared. However, antennas may be provided for each thin film integrated circuit and reception of the first to the third thin film integrated circuits can be controlled by a frequency transmitted from the reader/writer. In addition, reception of the first to the third thin film integrated circuits can be controlled by a communication means with the reader/writer.

As described above, by using the plurality of thin film integrated circuits, it is possible to control key information, preferably to update key information, and further control of writing to and reading from the memory circuits. Consequently, information leakage to a third person can be prevented and the security can be enhanced.

In this embodiment mode, three thin film integrated circuits, two memories and one antenna are used; however, the present invention is not limited thereto.

Embodiment Mode 2

Figure 4:
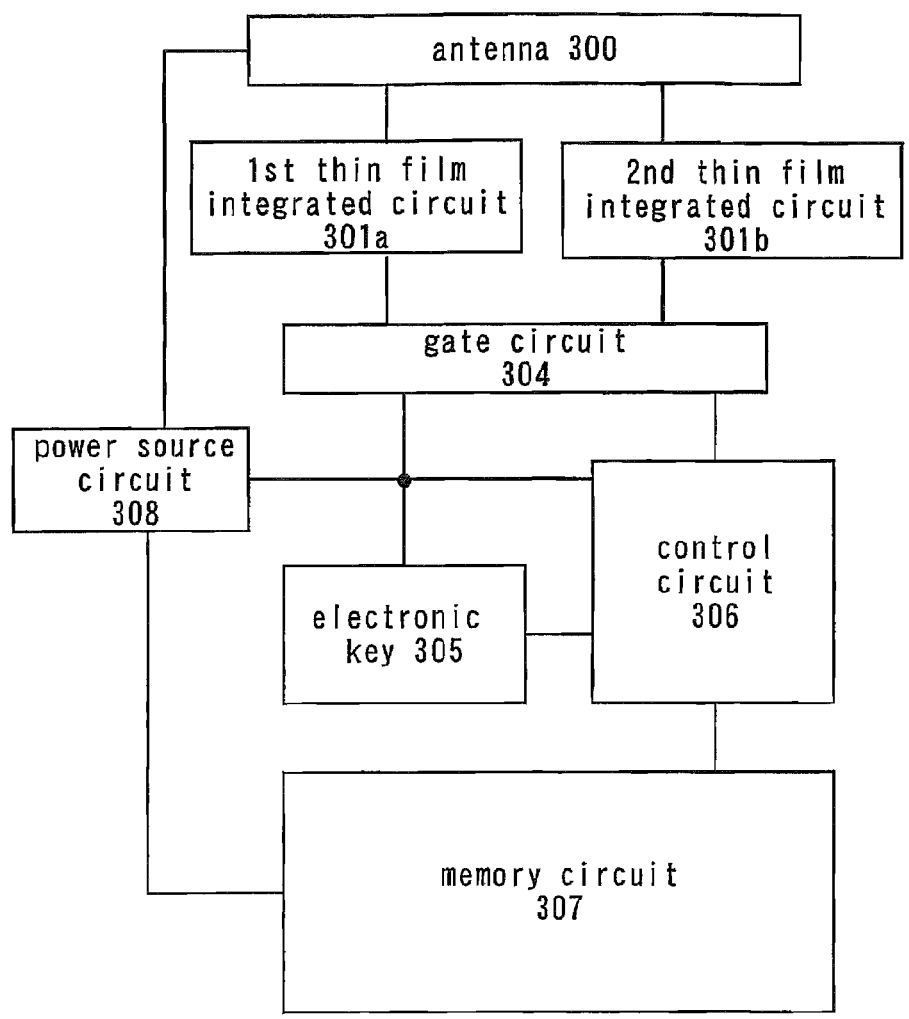
FIG. 4 shows a mode of a thin semiconductor device.

In Embodiment Mode 2, an operation method of a thin semiconductor device is described. The operation method is different from that of Embodiment Mode 1 in an update method of key information. As shown in FIG. 4, in the thin semiconductor device of this embodiment mode, a first thin film integrated circuit 301a and a second thin film integrated circuit 301b that share an antenna 300, are connected to an electronic key 305 and a control circuit 306 through a gate circuit 304. The electronic key 305 may be formed from a nonvolatile memory. This is because falsification of the electronic key itself and abuse accompanied with it can be prevented. A memory circuit 307 is connected to the control circuit 306. Note that the memory circuit 307 may include a first memory 307a and a second memory 307b. In addition, the antenna 300, the control circuit 306 and the memory circuit 307 are each connected to a power supply circuit 308.

Figure 5:
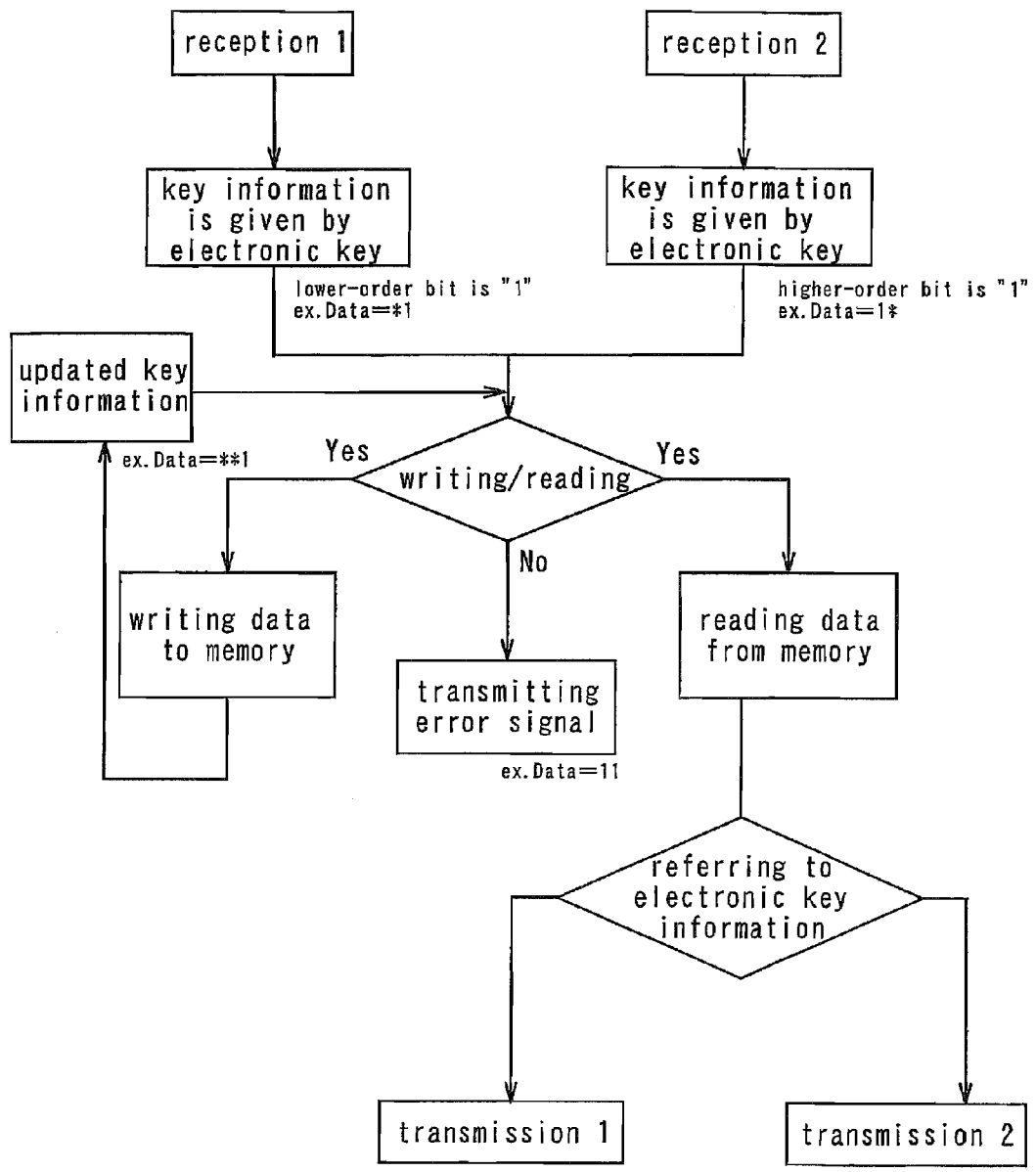
FIG. 5 is a flow chart showing an operation method of a thin semiconductor device.

An operation method of the above described thin semiconductor device is described by using a flow chart shown in FIG. 5. Data is input to the electronic key 305 by a first reception mode (Reception 1) and key information is given. Data is input to the electronic key 305 by a second reception mode (Reception 2) and key information is given. For example, control is done such that only the first thin film integrated circuit is operated by the first reception mode and only the second thin film integrated circuit is operated by the second reception mode.

The reception mode can be selected by employing different frequencies, e.g., f1 and f2, or different protocols e.g., P1 and P2 as described above.

Key information can be given such that, for example, "01" is obtained by the first reception mode (the lower-order bit is 1, namely, Data=*1) and "10" is obtained by the second reception mode (the higher-order bit is 1, namely, Data=1*).

Depending on this, for example, as shown in FIG. 6A, the first reception mode can adopt a frequency f1, a protocol P1 and key information "01". The second reception mode can adopt a frequency f2, a protocol P2 and key information "10".

Writing to or reading from the memory circuit 307 is controlled by the key information. For example, if key information for writing becomes possible, writing to the memory circuit is allowed. If key information for reading becomes possible, reading from the memory circuit is allowed. If the key information becomes impossible, an error signal is transmitted. Additionally, transmission to/reception from the first and the second thin film integrated circuits may be prohibited.

For example, as shown in FIG. 6B, reading from and writing to the memory circuit become possible when the key information is "00", namely, in an initial state. When the key information is "01", reading from the memory circuit is allowed, and writing is not allowed. When the key information is "10", reading from the memory 30. circuit is not allowed, and writing is allowed. When the key information is "11", reading from and writing to the memory circuit are not allowed. In this manner, it is possible to set key information, and reading from and writing to the memory circuit.

If an electronic key is formed by using two nonvolatile memories, key information is "01", "10" or "11", but key information can be formed by using n-pieces of nonvolatile memories. Consequently, as shown in a flow chart of FIG. 5, key information of the electronic key can be updated. For example, if four nonvolatile memories are used, even after "11" is obtained, "1100" is made and key information becomes "1101" or "1111" to control reading from and writing to the memory circuit.

After reading of the memory circuit is conducted, information is sent to the first thin film integrated circuit C1 or the second thin film integrated circuit C2. At this time, based on the key information, it is determined which one of thin film integrated circuits C1 and C2 receives information.

Embodiment Mode 3

Figure 7:
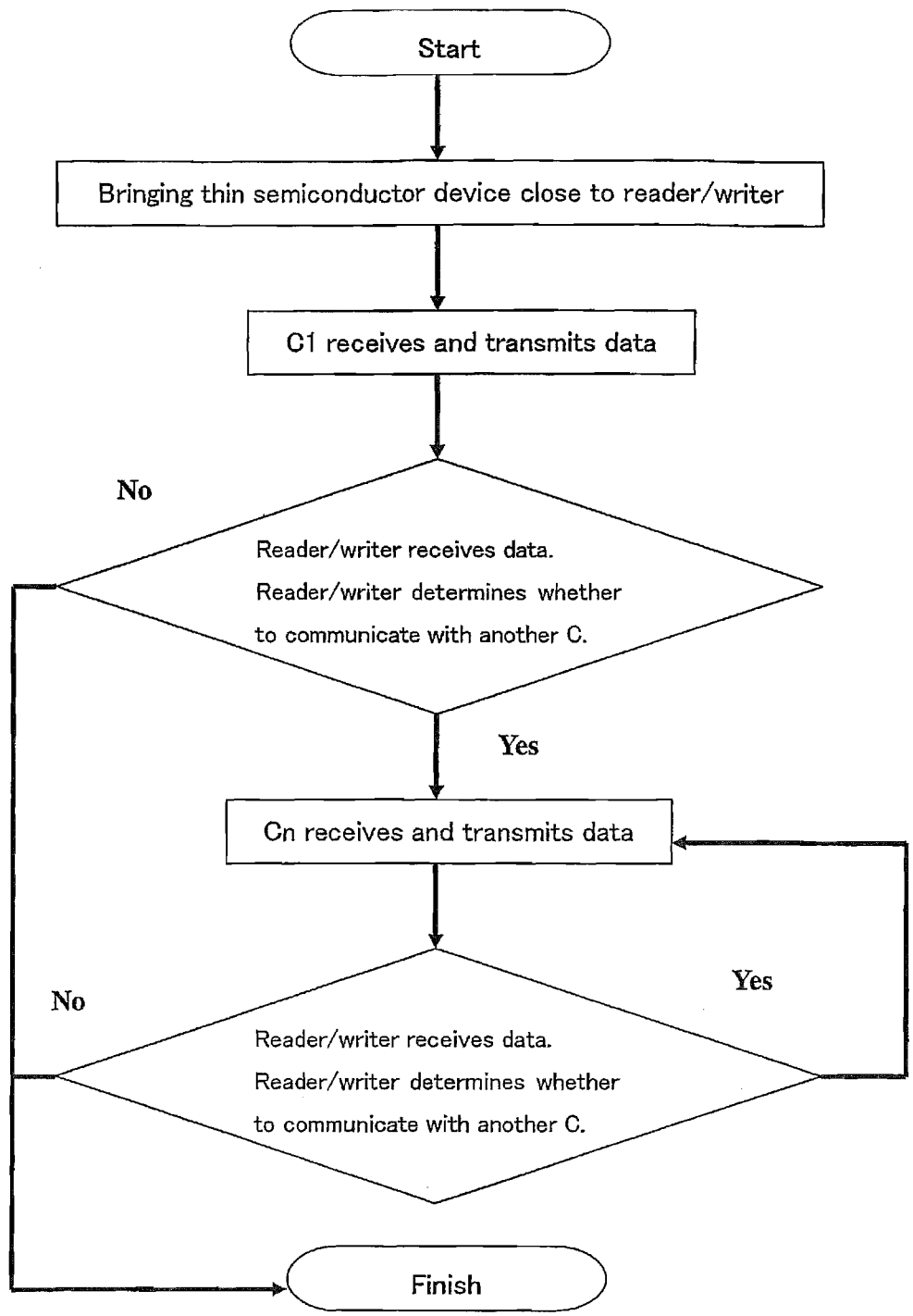
FIG. 7 is a flow chart showing an operation method of a thin semiconductor device.

Embodiment Mode 3 describes a communication system (communication mode) between a thin film integrated circuit and a reader/writer by using a flow chart shown in FIG. 7.

A thin semiconductor device is brought close to a reader/writer. At this time, a thin film integrated circuit C1 of the thin semiconductor device receives a signal. Thus, writing or the like to a memory circuit in the thin semiconductor device is conducted. Thereafter, information is sent from the thin film integrated circuit C1 to the reader/writer. Then, the reader/writer determines whether to communicate with another thin film integrated circuit Cn.

After that, communication with another thin film integrated circuit Cn is conducted, information is sent to the reader/writer from the thin film integrated circuit Cn. Thereafter, the reader/writer determines whether to communicate with another thin film integrated circuit.

Whether communication with another thin film integrated circuit is conducted or not may be determined depending on the thin film integrated circuit from which the reader/writer receives a signal. Information of the next thin film integrated circuit to be communicated with may be given to the reader/writer by the thin film integrated circuit which has conducted communication. When the number of communication with other thin film integrated circuits is increased, the security can be enhanced.

Communication between the thin semiconductor device and the reader/writer can adopt any of a sub millimeter wave (300 GHz to 3 THz), an extremely-high-frequency wave (EHF) (30 GHz to 300 GHz), a super-high-frequency wave (SHF) (3 GHz to 30 GHz), an ultra-high-frequency wave (UHF) (300 MHz to 3 GHz), a very-high-frequency (VHF) (30 MHz to 300 MHz), a high-frequency wave (HF) (3 MHz to 30 MHz), a medium-frequency wave (MF) (300 KHz to 3 MHz), a long frequency wave (LF) (30 KHz to 300 KHz) and a very-long frequency wave (VLF) (3 KHz to 30 KHz). The specific frequency can adopt any of 135 KHz, 6.78 MHz, 13.56 MHz, 27.125 MHz, 40.68 MHz, 433.92 MHz, 869.0 MHz, 915.0 MHz, 2.45 GHz, 5.8 GHz and 24.125 GHz. As a result, the reader/writer can transmit a signal to at least one of the plural thin film integrated circuits.

The communication between the thin semiconductor device and the reader/writer may adopt a digital modulation system. The digital modulation system is any of amplitude shift keying (ASK), frequency shift keying (FSK) and phase shift keying (PSK). As a result, the reader/writer can transmit a signal to at least one of the plural thin film integrated circuits.

The communication between the thin semiconductor device and the reader/writer may adopt an analog modulation system. The analog modulation system is any of amplitude modulation (AM), frequency modulation (FM) and phase modulation (PM). As a result, the reader/writer can transmit a signal to at least one of the plural thin film integrated circuits.

The communication between the thin semiconductor device and the reader/writer may adopt either one-way communication or two-way communication. Further, it can adopt any of a space division multiplex access method (SDMA), a polarization division multiplex access method (PDMA), a frequency-division multiplex access method (FDMA), a time-division multiplex access method (TDMA), a code division multiplex access method (CDMA) and an orthogonal frequency division multiplexing method (OFDM).

The communication between the thin semiconductor device and the reader/writer can adopt different protocols. As a result, the reader/writer can transmit a signal to at least one of the plural thin film integrated circuits.

By repeating the above described operations, the thin semiconductor device can communicate with the reader/writer. At this time, each thin film integrated circuit may mount an antenna or share an antenna. When an antenna is mounted on each thin film integrated circuit, frequencies received by each thin film integrated circuit may be different.

As described in this embodiment mode, the operation method of a thin semiconductor device can be set, for example, by the communication between a thin film integrated circuit of this embodiment mode and a reader/writer.

Embodiment Mode 4

Embodiment Mode 4 describes a mode of applying to food distribution a thin semiconductor device mounting a plurality of thin film integrated circuits as a tag, so-called ID tag, and an operation method thereof.

Figures 8A, 8B:
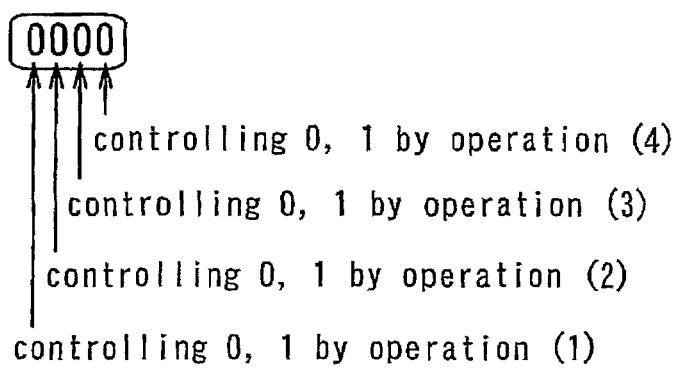
FIGS. 8A and 8B each show key information of a thin semiconductor device.

As shown in FIG. 8A, data of key information is set "0000" (initial value), "0001", "0011", "0111" or "1111". As described in the above embodiment mode, transmission to/reception from a thin film integrated circuit, namely, access to a memory, can be limited by the key information data.

As shown in FIG. 8B, this key information data can control "0" and "1" sequentially by operations (1) (2) (3) and (4). The operations (1) (2) (3) and (4) can be controlled, for example, depending on which thin film integrated circuit receives a signal, as described in the above embodiment mode.

Figure 9A:
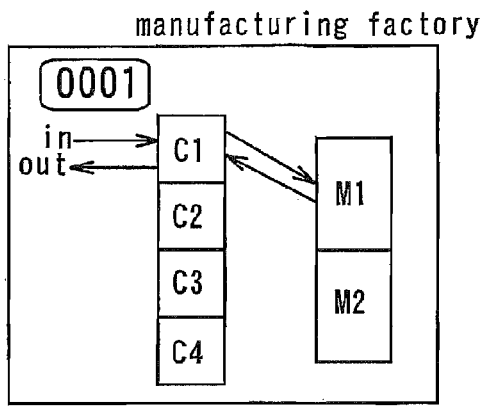
FIGS. 9A to 9E each show an operation method of a thin semiconductor device.

The thin semiconductor device having such key information data includes a first thin film integrated circuit C1, a second thin film integrated circuit C2, a third thin film integrated circuit C3, and a fourth thin film integrated circuit C4, and a first memory M1 and a second memory M2 that are each accessible, as shown in FIGS. 9A to 9E. As shown in FIG. 9A, only the first thin film integrated circuit C1 is allowed to be in an accessible state (state where a signal of In or Out is received). The first thin film integrated circuit C1 can perform writing or reading to the first memory M1. For example, key information is set "0001". For instance, such an operation to the thin semiconductor device is conducted by a reader/writer in a food manufacturing and processing factory, and basic data of a product such as a production area, a producer, a processing date, and an expiration date is written into the first memory M1. Before shipment, it is confirmed whether the basic data is accurately input into the first memory M1.

Figure 9D:
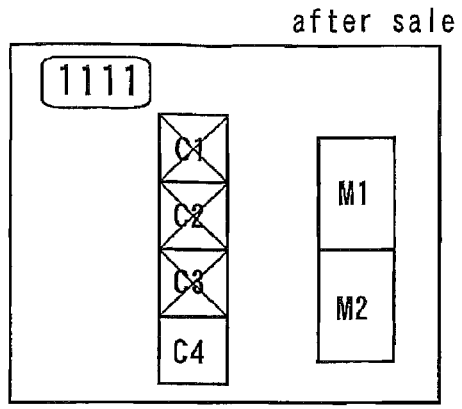
Figure 9B:
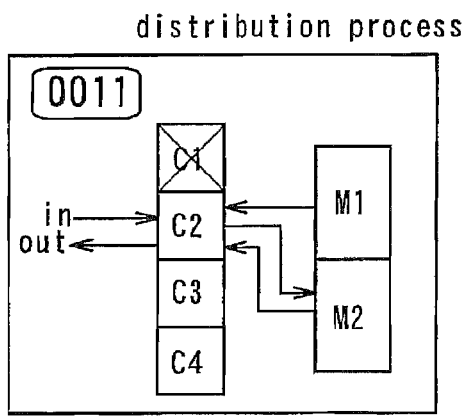

After that, when transmission to/reception from the second thin film integrated circuit C2 is tried, transmission to/reception from the first thin film integrated circuit C1 is prohibited as shown in FIG. 9B. For example, key information is set "0011". Note that prohibition of transmission to/reception from the first thin film integrated circuit C1 may be set in shipping from the manufacturing factory. As the result of the prohibition of transmission to/reception from the first thin film integrated circuit C1, writing to the first memory M1 is prohibited, only reading from the first memory M1 is allowed, and the second thin film integrated circuit C2 can be controlled so that writing or reading from the second memory M2 is allowed. For example, such an operation to a thin semiconductor device is performed by a reader/writer in distribution process. Then, falsification of basic data written in the manufacturing factory is not done in distribution process, and data necessary in the distribution process, such as delivery address or the number of deliveries, is written in the second memory M2. Before delivering, it can be confirmed whether data required in distribution process is input precisely to the second memory M2.

Figure 9E:
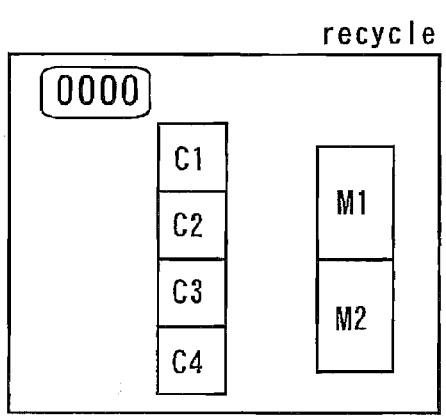
Figure 9C:
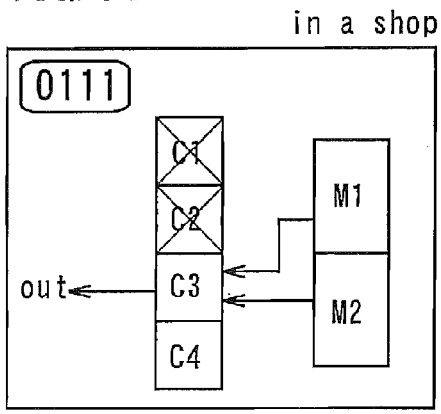

Then, when transmission to/reception from the third thin film integrated circuit C3 is tried, transmission to/reception from the second thin film integrated circuit C2 is prohibited as shown in FIG. 9C. For example, key information is set "0111". Note that prohibition of transmission to/reception from the second thin film integrated circuit C2 may be set in delivering from the distribution process. As the result of the prohibition of transmission to/reception from the second thin film integrated circuit C2, writing to the first and second memories M1 and M2 is prohibited, and only reading from the first and second memories M1 and M2 is possible. For example, such an operation to a thin semiconductor device is performed by using a reader/writer in a shop. Then, it is impossible to, in a shop, conduct falsification of data written in a manufacturing factory and a distribution process. In a shop, such written data may only be confirmed.

When a price of an article or the like is written, the price may be written in a bar code reader, since the price changes. A means for writing such as a memory or a barcode reader can be selected depending on data or content to be written.

Then, when transmission to/reception from the fourth thin film integrated circuit C4 is tried, transmission to/reception from the third thin film integrated circuit C3 is prohibited as shown in FIG. 9D. For example, key information is set "1111". Note that prohibition of transmission to/reception from the third thin film integrated circuit C3 may be set at the time of purchase in the shop. As the result of the prohibition of transmission and reception to the third thin film integrated circuit C3, writing to and reading from the first and second memories M1 and M2 are prohibited. For example, such an operation to a thin semiconductor device is performed by using a reader/writer in a shop, specifically, a system provided for a register. Then, falsification of data written in the first and second memories M1 and M2 cannot be conducted by a consumer or the like. Such written data may be only confirmed by a customer or the like in the shop.

Date written in the first memory M1 and the second memory M2 outside a shop can be read out by a consumer by controlling the number of thin film integrated circuits or memories, and a state in which transmission/reception are prohibited.

The thin semiconductor device, as shown in FIG. 9E, in which access to the first memory M1 and the second memory M2 is prohibited is preferably collected for recycling. For example, after purchasing an article, the thin semiconductor device may be collected at a cash register or the like. Since a customer or the like cannot read from the first memory M1 and the second memory M2 due to the fourth thin film integrated circuit C4, it may be collected at a cash register. In such collected thin semiconductor devices collected in this manner, information written to the first memory M1 and the second memory M2 is deleted. Thus, the first memory M1 and the second memory M2 may be formed from an EEPROM or the like, and information therein can be deleted by a physical means such as ultraviolet irradiation or a chemical process.

Note that, if information is not required to delete, the first memory M1 and the second memory M2 may be formed from a nonvolatile memory, which also leads to prevention of falsification.

In this embodiment mode, four thin film integrated circuits and two memories are used. However, the present invention is not limited thereto. For example, a memory can be shared or a memory can be formed in a thin film integrated circuit.

Such a thin semiconductor device in which plural thin film integrated circuits are mounted can prevent falsification of information about an article which passes through a large number of processes, and thus security can be improved.

In addition, a thin film integrated circuit of the present invention can be manufactured at a lower cost as compared with a conventional IC chip. Thus, a plurality of thin film integrated circuits can be mounted without increasing the cost of a thin semiconductor device.

Embodiment Mode 5

Embodiment Mode 5 describes a manufacturing method of a plurality of thin film integrated circuits.

Figure 10A:
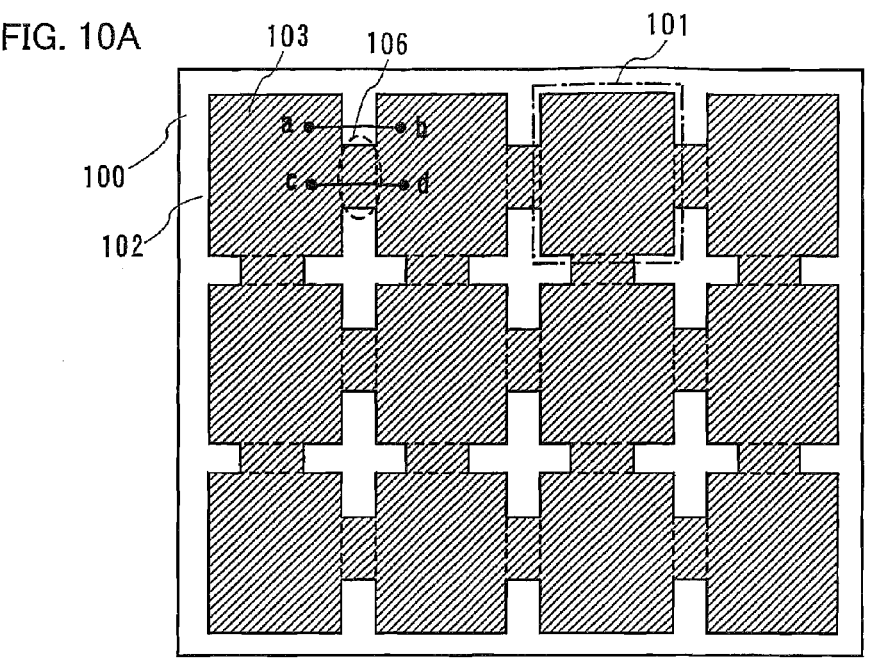
FIGS. 10A to 10C each show steps of manufacturing a thin semiconductor device.
Figure 10B:
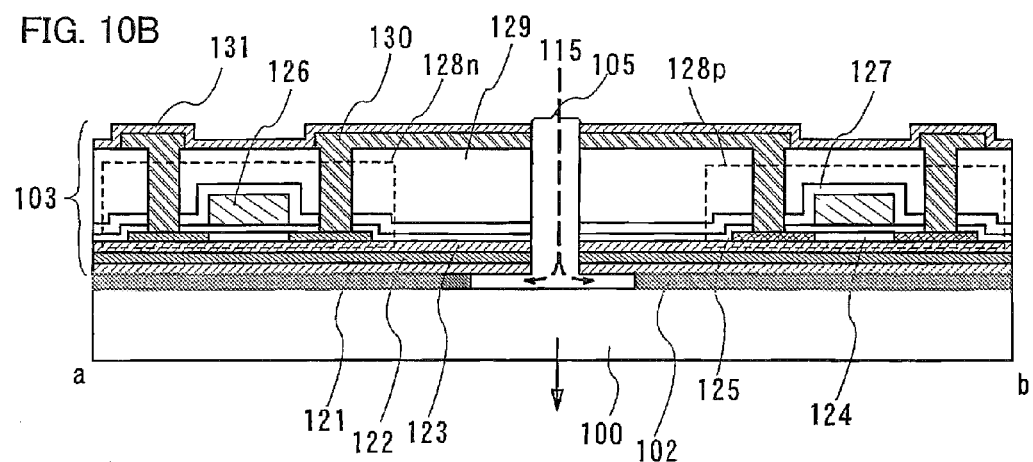
Figure 10C:
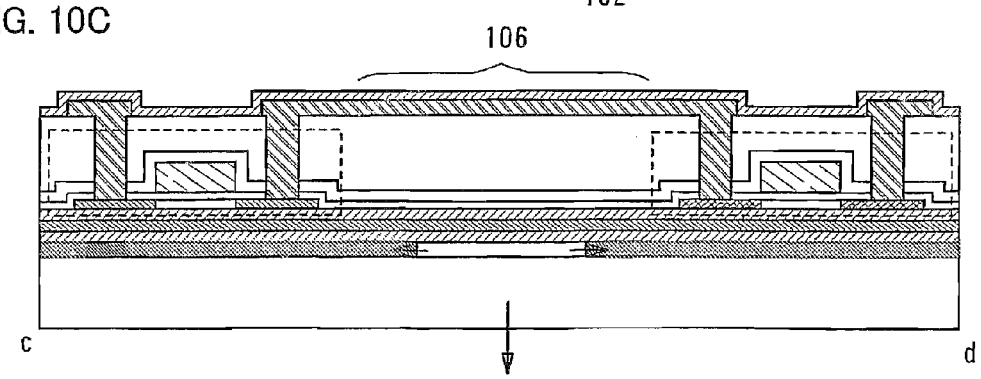

As shown in FIG. 10A, a separation layer 102, and a thin film transistor layer 103 (referred to as a TFT layer) having a semiconductor film as an active region are formed sequentially over an insulating substrate 100 to form a plurality of thin film integrated circuits 101. FIGS. 10B and 10C are cross-sectional views of a-b and c-d from FIG. 10A, respectively.

A glass substrate such as a barium borosilicate glass or an alumino borosilicate glass, a quartz substrate and the like are cited for the insulating substrate 100. In addition, a substrate made of plastic typified by polyethylene-terephthalate (PET), polyethylene naphthalate (PEN) or polyether sulfone (PES), or synthetic resin having flexibility such as acrylic is cited as other substrates having an insulating surface. In addition, a metal such as stainless or a semiconductor substrate whose surface is formed with an insulating film such silicon oxide or silicon nitride can be used. A shape of a mother substrate is not limited and lower cost of a thin film integrated circuit can be achieved by using such an insulating substrate 100, as compared with the case of forming an IC chip from a circular silicon wafer.

The separation layer 102 may include silicon, and the structure of the separation layer may be any one of an amorphous semiconductor, a semiamorphous semiconductor (also referred to as SAS) with an amorphous state and a crystalline state are mixed, and a crystalline semiconductor. Note that SAS contains a microcrystalline semiconductor in which crystal grains of 0.5 nm to 20 nm in size in an amorphous semiconductor film. Such a separation layer 102 can be formed by a sputtering method, a plasma CVD method or the like. The separation layer 102 may be 30 nm to 1 μm thick, or can be 30 nm thick or less as long as a film formation apparatus of the separation layer 102 permits.

In addition, the separation layer 102 may be added with an element such as phosphorus or boron. Further, the element may be activated by heating or the like. By adding such an element, the reaction speed of the separation layer 102, that is, an etching rate can be improved.

In this embodiment mode, SAS that is 30 nm to 1 μm thick, preferably 30 nm to 50 nm thick is used as the separation layer 102; however, other materials described above may be used.

At this time, the separation layer 102 may be selectively formed. For example, the separation layer 102 is not formed in the periphery of the insulating substrate 100. A TFT layer 103 is not parted due to selectively forming the separation layer 102, even after removing the separation layer. In other words, the TFT layer is integrated. As a method for forming the separation layer 102 selectively, the periphery of the insulating substrate 100 is etched, after a mask is arranged to cover the periphery of the insulating substrate 100 and the separation layer 102 is formed, or the separation layer 102 is formed over the entire surface of the insulating substrate 100.

Note that the TFT layer 103 includes thin film transistors 128n and 128p including a base insulating film, a semiconductor film 124 which has been patterned into a desired shape, a conductive film 126 functioning as a gate electrode (hereinafter, referred to as a gate electrode), which is formed through an insulating film 125 (hereinafter, a gate insulating film) serving as a gate insulting film. The semiconductor is 0.2 μm thick or less, typically 40 nm to 170 nm thick, preferably 50 nm to 150 nm thick. Note that the thin film transistor may have a single drain structure, an LDD (Lightly Doped Drain) structure, or a GOLD (Gate-drain Overlapped LDD) structure. In addition, the semiconductor film includes a channel formation region and an impurity region (including a source region, a drain region, a GOLD region, and an LDD region). The n-channel thin film transistor 128n and the p-channel thin film transistor 128p can be distinguished by a conductivity of the added impurity element. In addition, so as to prevent the channel from becoming shorter as the channel formation region becomes more minute, it is preferable to have a so-called sidewall structure by forming an insulator on a side of the gate electrode. A low concentration impurity region is formed under the insulator. A wiring 130 which is formed to be connected to each impurity region is included in the TFT layer 103.

The base insulating film formed over the separation layer 102 may have a single layer structure or a lamination structure of insulating films containing oxygen or nitrogen, such as silicon oxide ($SiO_x$), silicon nitride ($SiN_x$), silicon oxynitride ($SiO_xN_y$) (x>y) and silicon nitride oxide ($SiN_xO_y$) (x>y) (x, y=1, 2 . . . ) so that the TFT layer 103 is not be etched. This is because a sufficient selection ratio with the separation layer 102 to an etching gas can be obtained.

Thus, the base insulating film may have a lamination structure. In this embodiment mode, the base insulating film includes a first insulating film 121, a second insulating film 122, and a third insulating film 123. For example, a silicon oxide film as the first insulating film, a silicon oxynitride film as the second insulating film, and a silicon oxide film as the third insulating film are employed, respectively. In consideration of impurity diffusion from the insulating substrate 100 or the like, a silicon oxynitride film is preferably used; however, there is a concern that the silicon oxynitride film is low in adhesion to the separation layer and the semiconductor film. Thus, a silicon oxide film having high adhesion to the separation layer, the semiconductor film and the silicon oxynitride film, is provided.

The semiconductor film 124 may have an amorphous semiconductor, SAS in which an amorphous state and a crystalline state are mixed, or a crystalline semiconductor.

In this embodiment mode, an amorphous semiconductor film is formed and then a crystalline semiconductor film crystallized by a heat treatment is formed. As the heat treatment, a heating furnace, laser irradiation or irradiation of light emitted from a lamp (hereinafter, lamp annealing) instead of laser light, or a combination thereof can be used.

In the case of laser irradiation, a continuous wave laser beam (CW laser beam) or a pulsed oscillation laser beam (pulsed laser beam) can be used. As the laser beam, a beam emitted from one or plural kinds of an Ar laser, a Kr laser, an excimer laser, a YAG laser, a $Y_2O_3$ laser, a $YVO_4$ laser, a YLF laser, a $YAlO_3$ laser, a glass laser, a ruby laser, an alexandrite laser, a Ti: sapphire laser, a copper vapor laser, and a gold vapor laser, can be used. A laser beam having a fundamental wave of such lasers or a second to a fourth harmonic of the fundamental wave is irradiated to obtain a crystal with a large grain size. Typically, for instance, the second harmonic (532 nm) or the third harmonic (355 nm) of an $Nd:YVO_4$ laser (fundamental wave with 1064 nm) can be used. In this case, the power density of about 0.01 to 100 $MW/cm^2$ (preferably, 0.1 to 10 $MW/cm^2$) is required. The scanning rate is approximately set about 10 to 2,000 cm/sec to irradiate the semiconductor film.

Figure 19A:
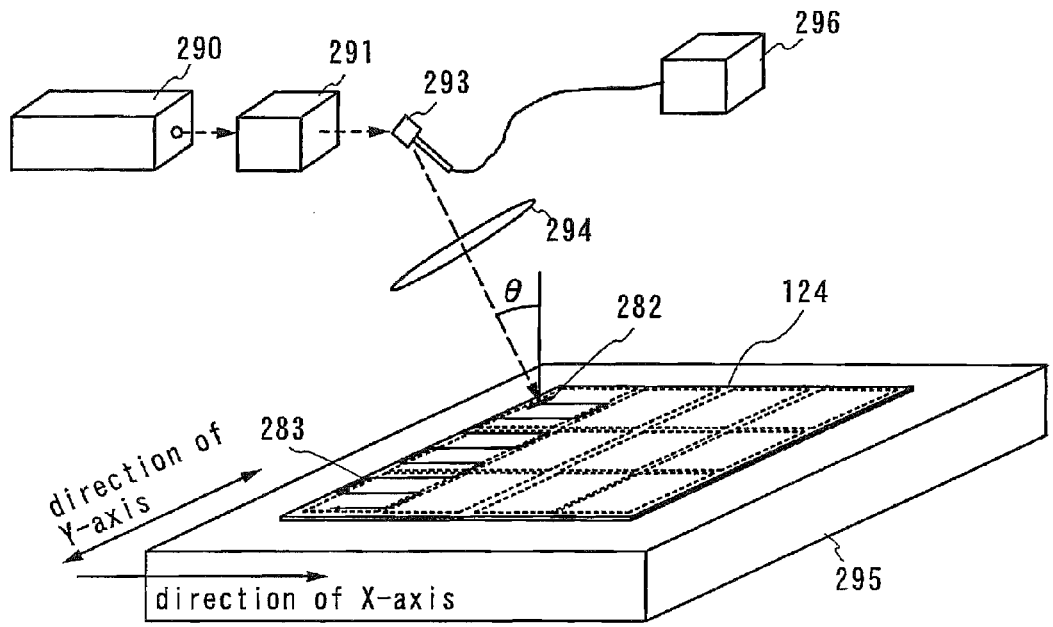
FIGS. 19A and 19B each show steps of manufacturing a thin semiconductor device.

At this time, for example, an optical system as shown in FIG. 19A is employed to conduct crystallization using a CW laser. First, a CW laser beam emitted form a laser oscillator 290 is elongated by an optical system 291 and then processed into a linear shape. Specifically, when the laser beam passes through a cylindrical lens or a convex lens of the optical system 291, the laser beam can be processed into a linear shape. At this time, it may be processed so that the length of the longitudinal axis of the beam spot is 200 to 350 μm.

After that, the laser beam that is processed into a linear shape enters a semiconductor film 124 through a galvanometer mirror 293 and an f θ lens 294. At this time, the linear laser beam is adjusted to form a laser spot 282 having a desired size on the semiconductor film. In addition, the shape of the laser spot 282 can be constant on the irradiated surface by the f θ lens 294, irrespective of an angel of the galvanometer mirror.

At this time, the galvanometer mirror is oscillated by a device for controlling oscillation of the galvanometer mirror (control device) 296, in other words, the angle of the galvanometer mirror is changed, and the laser spot 282 moves in one direction (for example, in the X-axis direction in FIG. 19A). For example, when the galvanometer mirror oscillates in half cycle, a laser beam moves a fixed distance in the X-axis direction on the semiconductor film (forth).

After that, the semiconductor film 124 moves in the Y-axis direction by an X-Y stage 295. Similarly, the laser spot moves in the X-axis direction on the semiconductor film by the galvanometer mirror (back). By such back and forth movement of the laser beam, the laser spot moves along a path 283, thereby conducting laser irradiation.

Figure 19B:
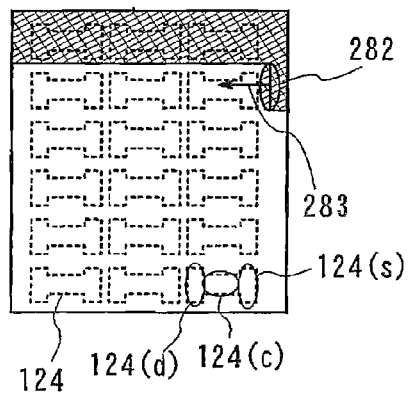

As shown in FIG. 19B, laser irradiation is performed so that movement direction of carriers of a thin film transistor is along the movement direction (a scanning direction) of the laser beam in the X-axis direction. For example, in the case of the semiconductor film 124 having a shape shown in FIG. 19B, a source region 124 (*s*), a channel formation region 124 (*c*), and a drain region 124 (*d*) to be formed in the semiconductor film are arranged so as to be parallel with the movement direction in the X-axis direction (scanning direction) of the laser beam. Consequently, mobility of a thin film transistor can be increased since grain boundaries that are crossed by carriers can be reduced or eliminated.

In addition, an incident angle θ of the laser beam may be set $0°<θ<90°$ to the semiconductor film. As a result, interference of the laser beam can be prevented.

A laser beam having a fundamental wave of a continuous wave laser and a laser beam having a harmonic of a continuous wave laser may be emitted. Alternatively, a laser beam having a fundamental wave of a continuous wave laser and a laser beam having a harmonic of a pulsed laser may be emitted. By using plural laser beams, energy can be compensated.

A pulsed laser beam can be used, which oscillates a laser with such an oscillation frequency that can emit the next pulsed laser beam, until the semiconductor film is melted due to irradiation of a laser beam and then solidified. By oscillating a laser beam with the frequency, crystal grains grown continuously in the scanning direction can be obtained. A specific oscillation frequency of a laser beam is 10 MHz or more, and this is a remarkably higher frequency band than a frequency band of several tens of Hz to several hundreds of Hz, which are employed generally.

Note that irradiation of a laser beam may be conducted in an inert gas atmosphere such as a rare gas or nitrogen. Thus, roughness on the semiconductor surface due to the irradiation of a laser beam can be suppressed, the planarity can be enhanced, and fluctuation on a threshold value generated due to variation of interface state density can be suppressed.

A microcrystalline semiconductor film is formed by using $SiH_4$ and $F_2$ or $SiH_4$ and $H_2$, and then laser irradiation described above is performed to crystallize the microcrystalline semiconductor film In the case of using a heating furnace as another heat treatment, an amorphous semiconductor film is heated for 2 to 20 hours at 500 to 550° C. At this time, the temperature may be set at multiple stages in the range of 500 to 550° C. in order to make the temperature higher gradually. By the initial low-temperature heat treatment, hydrogen or the like in. the amorphous semiconductor film comes out, and as the result, so-called dehydrogenation which can reduce film-roughness generated in the crystallization, can be conducted. Further, it is preferable that a metal element for promoting crystallization, such as Ni, is formed on an amorphous semiconductor film, since the heat temperature can be reduced. Even during crystallization when using such a metal element is conducted, it may be heated at 600 to 950° C.

However, when such a metal element is formed, there is concern that the metal element adversely affects electric characteristics of a semiconductor element, and thus a gettering step for reducing or removing the metal element is needed. For example, the metal element may be gettered using an amorphous semiconductor film as a gettering sink.

In addition, a crystalline semiconductor film may be formed directly on a surface. In this case, a crystalline semiconductor film can be formed directly on a surface using a fluorine-based gas such as $GeF_4$ or $F_2$ and a silane-based gas such as $SiH_4$ or $Si_2H_6$ with heat or plasma. When a crystalline semiconductor film is directly formed and a high temperature treatment is needed, a quartz substrate having a favorable heat resistance may be used.

It is considered that the separation layer 102 may be affected by the step of heating the semiconductor film. For example, energy may reach the separation layer 102, if a heat treatment using a heating furnace or laser irradiation using a wavelength of 532 nm is conducted. Consequently, the separation layer 102 is also crystallized in some cases. The reaction speed can also be improved by the crystallization state of the separation layer 102.

On the other hand, a structure of the base insulating film can be selected so that energy of a laser beam does not reach the separation layer 102, so as to crystallize the semiconductor film efficiently. For example, the material, film-thickness and lamination order of the base insulating film may be selected.

A semiconductor film formed by any one of the above-described means contains more hydrogen as compared with an IC chip formed from a silicon wafer. Specifically, the semiconductor film can be formed to have a hydrogen concentration of $1\times10^{19}$ to $1\times10^{22}$ atoms/cm$^3$, preferably, $1\times10^{19}$ to $5\times10^{20}$ atoms/cm$^3$. Using the contained hydrogen, a termination effect of releasing dangling bonds within the semiconductor film, can be obtained. Further, using the hydrogen, flexibility of the thin film integrated circuit can be increased.

Further, the percentage of an area of the thin film integrated circuit occupied by a patterned semiconductor film is set 1 to 30%, and thus, breakdown or peeling of the thin film transistor due to bending stress can be prevented.

In the case of such a TFT having a semiconductor, the subthreshold coefficient (S value) of the TFT can be set 0.35 V/sec or lower, preferably, 0.25 to 0.09 V/sec, and the mobility of the TFT can be set to be 10 cm$^2$/Vsec or higher.

When a 19-stage ring oscillator is formed by using the TFT, a characteristic of the oscillation frequency of 1 MH or more, preferably 100 MHz or more at the power supply voltage of 3 to 5 V can be obtained. In addition, the delay time for each stage of an inverter can be 26 ns, preferably 0.26 ns or less at the power supply voltage of 3 to 5V.

As described above, such a thin film integrated circuit includes an extremely thin semiconductor film as an active region. Thus, the thin film integrated circuit can be thinner as compared with an IC chip formed from a silicon wafer. Specific thickness of such a thin film integrated circuit is set 0.3 μm to 3 μm, typically about 2 μm.

By the above described structure, a function of a TFT can be obtained; however, preferably, a first interlayer insulating film 127 and a second interlayer insulating film 129 may be formed. Damages, defects or the like of a semiconductor film from a laser can be repaired by hydrogen from the first interlayer insulating film 127. In other words, a termination effect of defects by hydrogen can be obtained. An insulating film containing oxygen or nitrogen, such as silicon oxide (SiO$_x$), silicon nitride (SiN$_x$), silicon oxynitride (SiO$_x$N$_y$) (x>y) and silicon nitride oxide (SiN$_x$O$_y$) (x>y) (x, y=1, 2 . . . ) can be used for the first interlayer insulating film 127.

Planarity can be enhanced by the second interlayer insulating film 129. An organic material or an inorganic material can be used for the second interlayer insulating film 129. Polyimide, acrylic, polyamide, polyimide amide, a resist, benzocyclobutene, siloxane, or polysilazane can be used as the organic material. Siloxane has a skeleton structure with a bond of silicon (Si) and oxygen (O). As a substituent thereof, an organic group including at least hydrogen (such as alkyl group or aromatic hydrocarbon) is used. Further, a fluoro group may be used for the substituent. Also, an organic group including at least hydrogen and a fluoro group may be used for the substituent. Polysilazane is formed from a liquid material including a polymer material having a bond of silicon (Si) and nitrogen (N). An insulating film containing oxygen or nitrogen such as a silicon oxide (SiOx) film, a silicon nitride (SiNx) film, a silicon oxynitride (SiOxNy) (x>y) film, or a silicon nitride oxide (SiNxOy) (x>y) (x, y=1, 2 . . . ) film can be used as the inorganic material. In addition, a laminated structure of the insulating films described above may be used for the second interlayer insulating film 129. When the second interlayer insulating film 129 is formed by using e.g., an organic material, planarity is improved; however water and oxygen are easily absorbed. An insulating film containing an inorganic material is preferably formed over the organic material to prevent absorption of water and oxygen. When an insulating film containing nitrogen is used for the inorganic material, entry of alkali ions such as Na, in addition to water, can be prevented.

More preferably, a fourth insulating film 131 is provided to cover the wiring 130. Since an article mounted with a thin film integrated circuit is often touched by bare hands, there is concern of diffusion of alkali ions such as Na. Therefore, the fourth insulating film 131 is preferably formed on the top surface of the thin film integrated circuit. An insulating film containing oxygen or nitrogen such as a silicon oxide (SiOx) film, a silicon nitride (SiNx) film, a silicon oxynitride (SiOxNy) (x>y) film, or a silicon nitride oxide (SiNxOy) (x>y) (x, y=1, 2 . . . ) film can be used as the fourth insulating film 131. Typically, a silicon nitride oxide (SiNxOy) film may be used.

Thereafter, a groove 105 is formed between the thin film integrated circuits 101. The groove 105 can be formed by dicing, scribing, etching with the use of a mask, or the like. The shape of the groove 105 can be circular (hole) or rectangular (slit-like). A blade dicing method with a dicing apparatus (dicer) is commonly employed for dicing. The blade is a grinding stone into which diamond abrasive grains are embedded, and has the width of approximately 30 μm to 50 μm. The TFT layer 103 is separated by rapidly spinning the blade. A diamond scribing method, a laser scribing method, or the like is used for scribing. In the case of etching, the TFT layer can be separated by dry etching, wet etching, or the like after forming a mask pattern by a light-exposure step and a development step. In dry etching, an atmospheric plasma method may be used. Thus, by employing the above described method, the groove 105 can be formed between the thin film integrated circuits 101.

Note that the groove 105 need not necessarily be formed between each thin film integrated circuits, but it may be formed between regions where plural thin film integrated circuits are formed.

An opening portion may be formed in the TFT layer 103. In this case, the opening portion is required to be formed in a region other than the region where a conductive film to become a channel formation region is formed. By using such an opening portion and a groove together, the size or number of the groove 105 can be adjusted or the time required for removing the separation layer 102 can be shortened. The opening portion may be circular, rectangular or the like.

When the groove 105 is selectively formed between each thin film integrated circuit 101, an insulating film or a conductive film is left in a region other than the groove 105 between the thin film integrated circuits. Such an insulating film, a conductive film or the like that is left between thin film integrated circuits is referred to as a connection region 106. Note that the connection region 106 may have a function of connecting the thin film integrated circuits so as not to be isolated from one another, and may include any of an insulating film and a conductive film. Further, the connection region may be formed as a single layer or a laminated layer.

The thin film integrated circuit 101 is fixed to the insulating substrate 100 in a region 104 where the separation layer 102 is not formed. Therefore, the thin film integrated circuit 101 is never separated from the insulating substrate 100.

At this time, the separation layer 102 is removed. Firstly, an etching agent for removing the separation layer 102 is introduced. As the etching gas, a gas or a liquid containing halogen fluoride can be employed. For example, $ClF_3$ (chlorine trifluoride) can be used as halogen fluoride. Note that $ClF_3$ can be generated through a process of $Cl_2(g)+3F_2(g)\rightarrow 2ClF_3(g)$ by the reaction of chlorine with fluorine at temperatures of 200° C. or more. $ClF_3$ (boiling point: 11.75° C.) can liquefy depending on the temperature of the reaction field. In such a case, wet etching can also be employed using $ClF_3$ as the liquid containing halide. A gas of $ClF_3$ or the like mixed with nitrogen may be used as another gas containing halide.

The etching agent is not limited to $ClF_3$ or halide as long as it etches the separation layer 102 but it does not etch the base film. For example, a plasma gas containing fluorine such as $CF_4$, $SF_6$, $NF_3$, or $F_2$ can be used. A strong alkaline solution such as tetraethylammonium hydroxide (TMAH) may be used as another etching agent.

In the case of chemically removing the separation layer 102 with a gas containing halide such as $ClF_3$, the combination of the separation layer 102 and the base film is not limited to the above-described material, as long as the material that is selectively etched is used for the separation layer 102 and a material that is not etched is used for the base film.

In this embodiment mode, the separation layer 102 can be removed with a low pressure CVD apparatus under the following conditions: an etching agent is $ClF_3$ (chlorine trifluoride) gas; temperature, 350° C.; flow rate, 300 sccm; pressure, 799.8 Pa (6 Torr); and time, 3 hours. However, the conditions are not limited thereto. Further, a low pressure CVD apparatus has a bell jar that can treat plural thin film integrated circuits 100. As the result thereof, mass-productivity of thin film integrated circuits can be increased. When an unnecessary gas is expelled through an exhaust pipe, there is no possibility that the thin film integrate circuits are drawn into the exhaust pipe since the thin film integrated circuits are integrated with the insulating substrate 100 by the connection region 106.

Further, a heating means, for example, a heater may be provided on the side face of the low pressure CVD apparatus. The process temperature is set at 100 to 300° C. by a heating means, thereby increasing the reaction speed of the separation layer 102 and an etching agent. Accordingly, the amount of used etching agent can be reduced and the process time can be shortened.

The separation layer 102 gradually recedes by introducing an etching agent in the above aforementioned manner. Thus, the separation layer 102 can be removed.

When introducing an etching agent, an etching agent, gas flow rate, temperature, and the like are set so that the TFT layer 103 is not etched. Since $ClF_3$ used in this embodiment mode has a characteristic of selectively etching silicon, it can selectively remove the separation layer 102. Therefore, an insulating film containing oxygen or nitrogen is preferably used as the base insulating film so that the TFT layer 103 is not etched. Since difference in the reaction rate between the separation layer and the base film is large, meaning that the selectivity is high, the separation layer 102 can be easily removed, with the thin film integrated circuit protected. In this embodiment mode, it is possible to prevent the TFT layer 103 from reacting with the etching agent, by using silicon oxynitride or the like provided above and below the TFT layer 103 and edge portions of an interlayer insulating film, a gate insulating film, a wiring, and the like which are exposed on the side face.

Thereafter, the insulating substrate 100 is separated. At this time, the thin film integrated circuits are not separated from one another, since they are connected by the connection region 106.

The separated insulating substrate 100 can be reused. Accordingly, reduction in cost of thin film integrated circuits can be achieved. In the case of reuse, dicing, scribing, or the like in forming the groove 105 is preferably conducted in order not to damage the insulating substrate 100. However, even when the insulating substrate is damaged, a planarizing treatment can be performed by forming an organic resin or an inorganic film using a coating method or a droplet discharge method. Note that a droplet discharge method is a method for selectively discharging (spraying) a droplet (also referred to as a dot) of a composition mixed with a material of a conductive film, an insulating film, or the like, which is also referred to as an ink-jet method depending on its system.

Figure 11A:
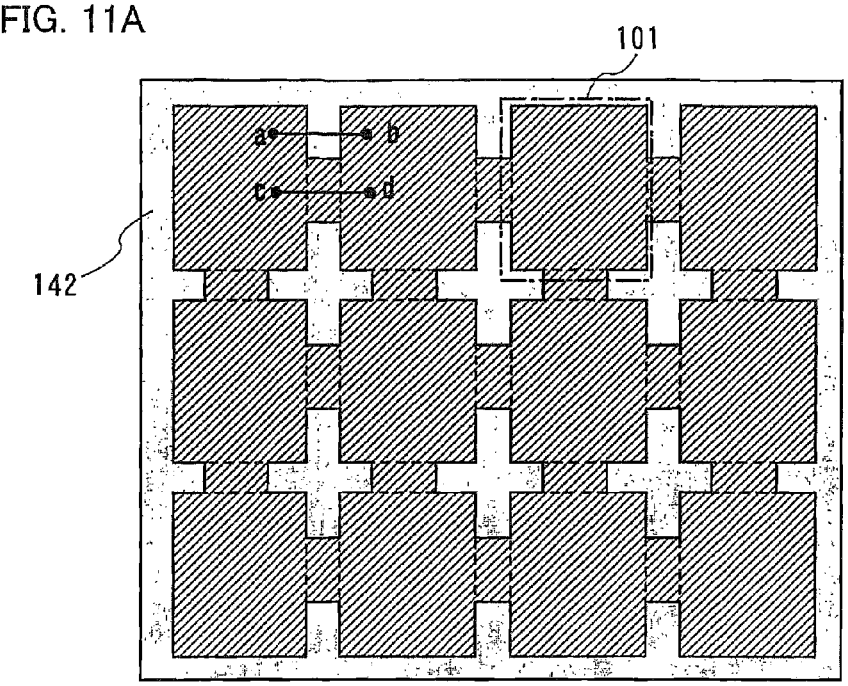
FIGS. 11A to 11C each show steps of manufacturing a thin semiconductor device.
Figure 11B:
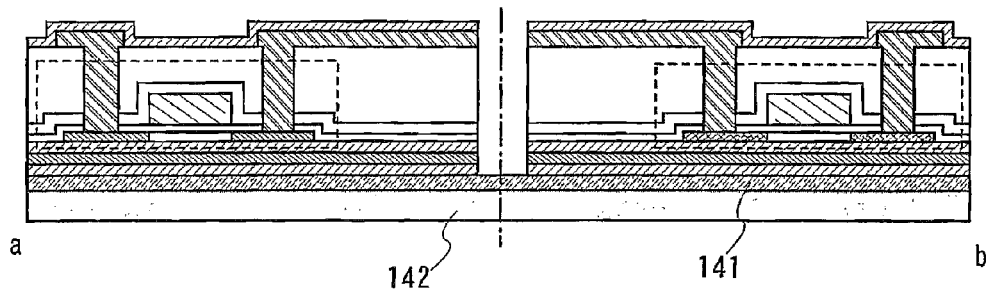
Figure 11C:
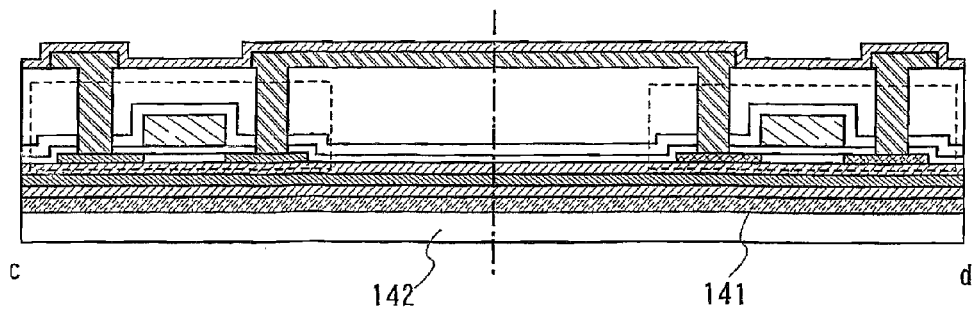

As shown in FIG. 11A, the thin film integrated circuits can be attached to a different base material 142 by an adhesive agent 141. The base material 142 may be a flexible substrate. A substrate made of a flexible synthetic resin such as plastic typified by polyethylene terephthalate (PET), polyethylene naphthalate (PEN), or polyeter sulfone (PES) or acrylic can be used as the flexible substrate.

An adhesive agent of a thermosetting resin, an ultraviolet curing resin, an epoxy resin, a resin additive, or the like; a two-sided tape; or the like can be used as the adhesive agent 141.

As a result of transferring the thin film integrated circuit to the flexible substrate, the flexibility and the breaking strength of the thin film integrated circuit can be increased. The thin film integrated circuit transferred to the flexible substrate can be made more lightweight, thinner, and more flexible than a thin film integrated circuit formed over the insulating substrate 100.

The different base material 142 may be a surface of an article on which the thin film integrated circuit is to be mounted. In other words, the thin film integrated circuit 101 without the insulating substrate 100 can be completed and mounted on an article. Thus, thinning of a thin film integrated circuit, and thinning and reducing in weight of an article mounted with the thin film integrated circuit can also be achieved.

Thereafter, the thin film integrated circuits are cut by a dicing, scribing, or laser cutting method. For example, the thin film integrated circuits can be cut by using a laser which is absorbed by a glass substrate, such as a $CO_2$ laser.

The periphery of the thin film integrated circuit such as a side face may be covered with an organic resin such as an epoxy resin. Accordingly, the thin film integrated circuit is protected from outside and becomes easily portable.

The thusly sectioned thin film integrated circuit can be 5 mm square (25 mm$^2$) or less, preferably, 0.3 mm square (0.09 mm$^2$) to 4 mm square (16 mm$^2$).

When a thin film integrated circuit is formed on the insulating substrate 100, it has fewer limitations on the shape of a mother substrate as compared with an IC chip formed by using a circular silicon wafer. Therefore, mass-productivity of thin film integrated circuits is enhanced and thus thin film integrated circuits can be mass-produced. Cost reduction of thin film integrated circuits can be achieved, since the insulating substrate 100 is reused.

The thin film integrated circuit of the present invention has a semiconductor film of 0.2 µm or less, typically 40 nm to 170 nm, preferably 50 nm to 150 nm, as an active region and is very thin, unlike an IC chip formed with a silicon wafer. Accordingly, even when the thin film integrated circuit is mounted on an article, the thin film integrated circuit is difficult to be confirmed, which helps to prevent falsification.

In order to increase the strength of such a thin film integrated circuit, the method for transferring to a flexible substrate can be employed. Such a thin film integrated circuit is harder to damage than an IC chip formed from a silicon wafer.

A thin film integrated circuit of the present invention is in no danger of wave absorption and has good reception of signals as compared to an IC chip formed from a silicon wafer, since the thin film integrated circuit does not have a silicon wafer.

Since the thin film integrated circuit of the present invention does not have a silicon wafer, it can be light-transmitting. As a result, the design is not spoiled, even if the thin film integrated circuit is mounted on a printed surface of an article.

A thin film integrated circuit of the present invention can obtain electric power or a signal by an antenna. This antenna can be formed directly on the thin film integrated circuit. In addition, the thin film integrated circuit can be attached to an antenna that is formed on another substrate.

Specifically, thin semiconductor devices including thin film integrated circuits include a contactless thin semiconductor device mounted with an antenna (functioning as a RF tag or an RF chip), a contact thin semiconductor device provided with a terminal connected to an external power source without an antenna mounted, and a hybrid thin semiconductor device which is a combination of a contactless one and a contact one. The thin film integrated circuit shown in this embodiment mode can be applied to any of the thin semiconductor devices described above.

Figure 12A:
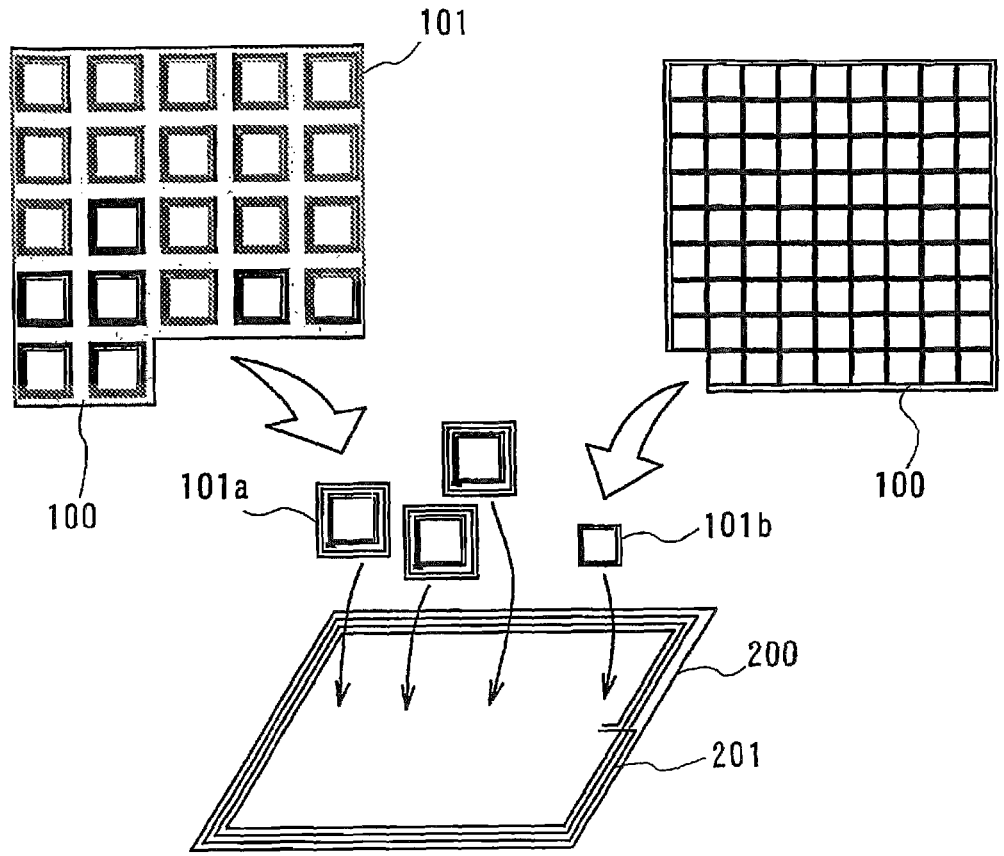
FIGS. 12A to 12C each show steps of mounting a thin semiconductor device.
Figure 12B:
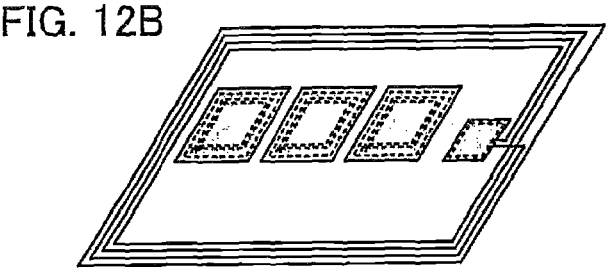

The thus formed thin film integrated circuits are each mounted on a thin semiconductor device. For example, as shown in FIG. 12A, each thin film integrated circuit 101 is cut out from the insulating substrate 100. The thin film integrated circuit 101 is mounted on a thin semiconductor device, specifically, a base material 200 for a card. For example, cases where a thin film integrated circuit 101a in which an antenna is integrated and a thin film integrated circuit 101b in which an antenna is not integrated are each mounted on the base material 200 are described. An external antenna 201 is formed on the base material 200, and a thin film integrated circuit 101b is mounted to be electrically connected to the antenna. At the time, the antenna can be connected to the thin film integrated circuit 101b by a resin having a conductor, e.g., anisotropic conductive resin (ACF). In addition, the thin film integrated circuit 101a where an antenna is integrated is mounted on the base material 200 by an adhesive agent, e.g., a two-sided tape (FIG. 12B).

Figure 12C:
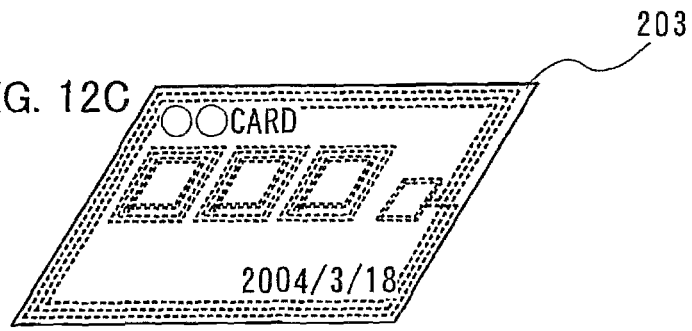

After that, as shown in FIG. 12C, a sheet for regulating thickness regulation, and a sheet (overlay sheet) for the front and back sides are formed, thereby completing a thin semiconductor device, specifically a card 203. Characters and pictures can be printed on the sheet for the front and back sides. In addition, by mounting a thin film integrated circuit, it is unnecessary to print a card number or the like that has been printed on a conventional card. Further, security can be enhanced since a plurality of thin film integrated circuits can be mounted.

Since a thin film integrated circuit of the present invention is formed on an insulating substrate 100, it has fewer limitations on the shape of a mother substrate as compared with an IC chip formed by using a circular silicon wafer. Therefore, mass-productivity of thin film integrated circuits is enhanced and thus thin film integrated circuits can be mass-produced. As the result thereof, cost reduction of thin film integrated circuits can be expected. A thin film integrated circuit formed at extremely low unit cost can generate big profits.

For example, the case of using a silicon substrate with a diameter of 12 inches is compared with the case of using a glass substrate with a size of 730×920 $mm^2$. The silicon substrate has an area of about 73000 $mm^2$ whereas the glass substrate has an area of about 672000 $mm^2$, that is, the glass substrate is about 9.2 times larger than the silicon substrate. On the glass substrate with an area of about 672000 $mm^2$, about 672000 ID chips each having an area of 1 mm square can be formed when a margin for cutting the substrate is not taken into account, which is about 9.2 times more than the ID chips formed on the silicon substrate. In the case of using the glass substrate with a size of 730×920 $mm^2$, which requires fewer manufacturing steps, facility investment cost for mass production of ID chips can be reduced by one-third of the case in which the silicon substrate with a diameter of 12 inches is used.

Embodiment Mode 6

Embodiment Mode 6 describes a mode of a plurality of thin film integrated circuits included in a thin semiconductor device.

Figure 13:
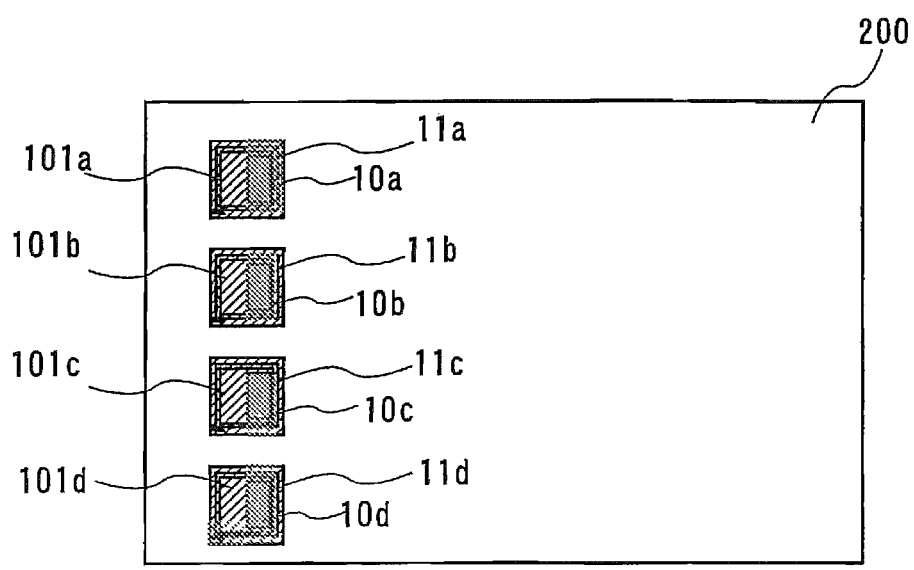
FIG. 13 shows a mode of a thin semiconductor device.

In FIG. 13, a plurality of thin film integrated circuits 101a, 101b, 101c and 101d in which memories 10a, 10b, 10c and 10d and antennas 11a, 11b, 11c and 11d are respectively integrated and are mounted on a base material 200. In this manner, the plurality of thin film integrated circuits having the same shape can have different communication protocols, different storage information to a memory, or the like. Consequently, this case can enhance security of a thin semiconductor device more, as compared with the case of mounting the same thin film integrated circuits.

Figure 14:
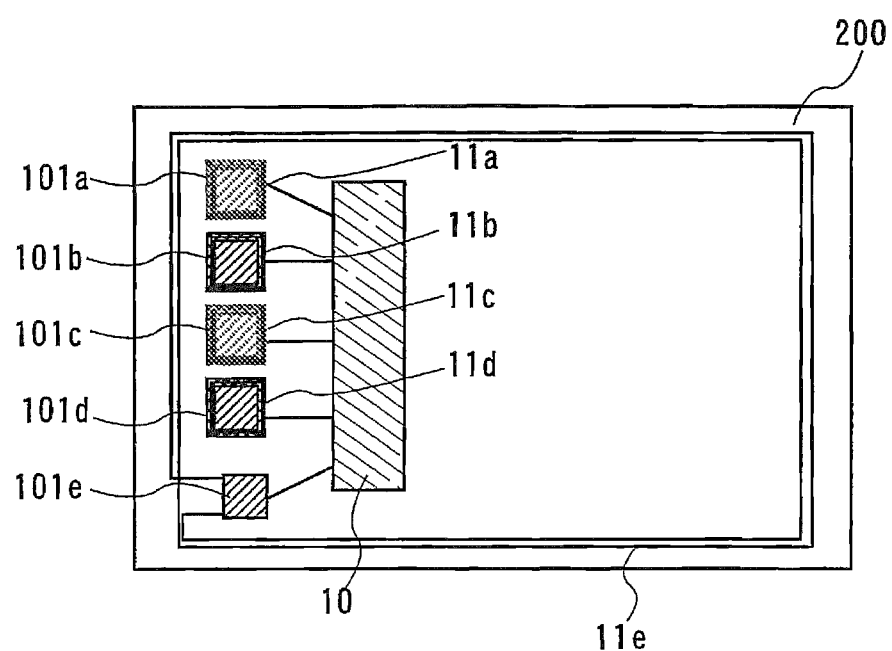
FIG. 14 shows a mode of a thin semiconductor device.

As shown in FIG. 14, a memory 10 formed over the base material 200 may be shared by the thin film integrated circuits 101a, 101b, 101c, 101d, and 101e. By sharing the memory that occupies the largest area, miniaturization of a thin semiconductor device can be achieved. Further, a mounting area of a thin film integrated circuit is enlarged and thus, the possibility of mounting increases. In addition, the thin film integrated circuits each have the antennas 11a, 11b, 11c, 11d and 11e; however, the shape of each antenna is not limited to those in FIG. 14.

Figure 15:
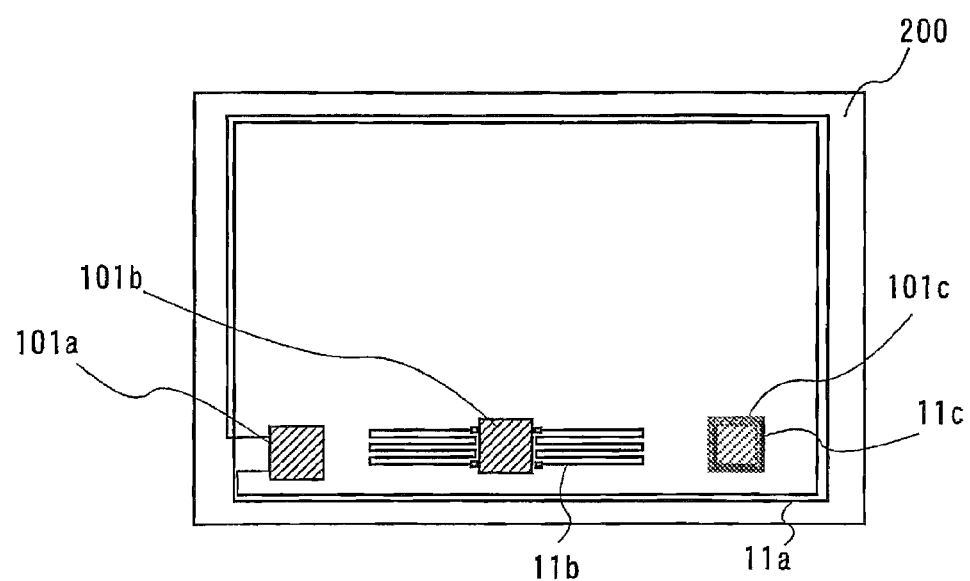
FIG. 15 shows a mode of a thin semiconductor device.

As shown in FIG. 15, thin film integrated circuits 101a, 101b, and 101c having different antenna lengths based on each antenna 11a, 11b and 11c formed over the base material 200, may be mounted.

A thin semiconductor device of the present invention is not limited to the modes of the thin film integrated circuits shown in FIGS. 13 to 15. The thin film integrated circuits shown in FIGS. 13 to 15 can be combined with one another.

In this embodiment mode, a contactless thin semiconductor device having a thin film integrated circuit mounting an antenna is described; however, a mode of a thin semiconductor device is not limited thereto. In other words, a contact thin semiconductor device having a connection terminal, or a hybrid thin semiconductor device which is a combination of a contactless one and a contact one may be employed.

This embodiment mode describes the case where each thin film integrated circuit has an antenna; however, an antenna can be shared by a plurality of thin film integrated circuits.

Embodiment Mode 7

Embodiment Mode 7 describes an article mounted with an ID chip (hereinafter, a chip group) on which a plurality of thin film integrated circuits are mounted.

As an example of prevention of counterfeiting products, cases of mounting a chip group on various products are described. Cases in which a chip group is attached to a passport, a license card, or the like are described in this embodiment mode.

Figure 16A:
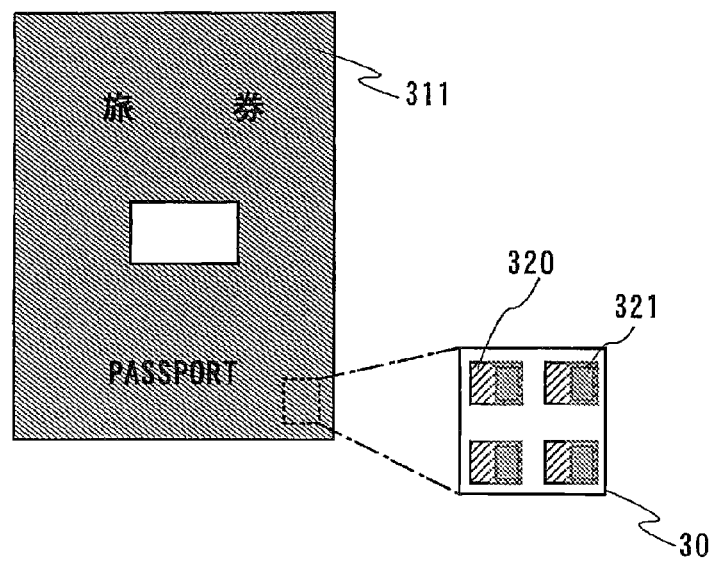
FIGS. 16A and 16B each show an article provided with thin film integrated circuits.

FIG. 16A illustrates a passport 311 mounted with a chip group 30. The chip group 30 includes four thin film integrated circuits 320 in which each memory 321 is integrated. In FIG. 16A, the chip group 30 is mounted on a front cover of the passport; however, it may be mounted on another page and may be mounted on a surface of the cover since the chip group 30 is light-transmitting. Alternatively, the chip group 30 may be embedded in the cover so as to be sandwiched by a material of the cover or the like. By mounting a chip group of the present invention, its security such as prevention of falsification of a thin film integrated circuit or information leakage from a thin film integrated circuit can be enhanced. Counterfeiting a passport or the like can be prevented.

Note that, in FIG. 16A, the chip group 30 having memories 321 integrated in the four thin film integrated circuits 320 is described; however the present invention is not limited thereto. In other words, in the present invention, the number of thin film integrated circuits, memories, and methods for forming a thin film integrated circuit and a memory are not limited.

Figure 16B:
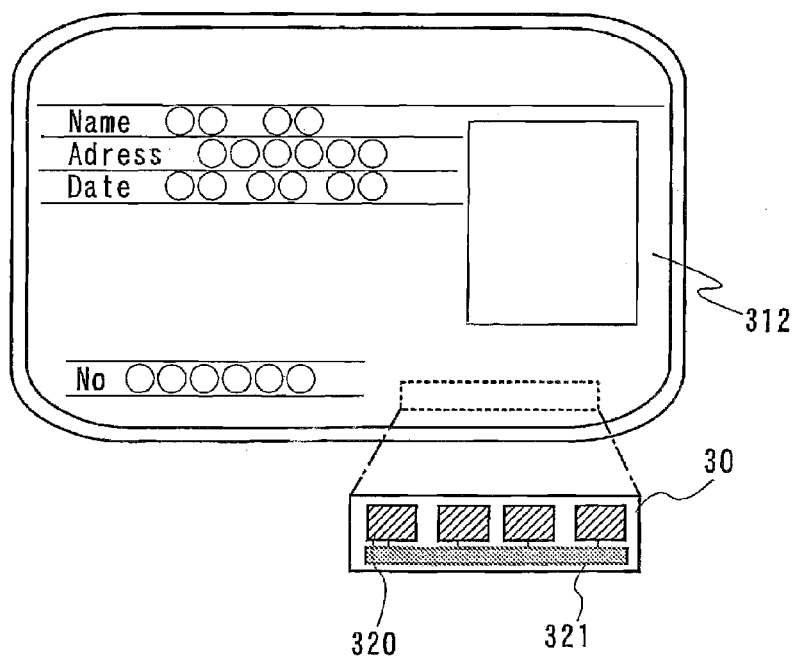

FIG. 16B illustrates a license card 312 mounted with the chip group 30. The chip group 30 includes four thin film integrated circuits 320 in which a memory 321 is integrated. In FIG. 16B, the chip group 30 is embedded in the license card 312. The chip group 30 which is light-transmitting may be set on a print side of the license card 312, for example, the chip group 30 can be set on the print side of the license card 312 and covered with a laminate material. Alternatively, the chip group 30 may be embedded in the license card 312 so as to be sandwiched by a material of the license card 312. By mounting a chip group of the present invention, its security such as prevention of falsification of a thin, film integrated circuit or information leakage from a thin film integrated circuit can be enhanced. Counterfeiting a license card or the like can be prevented.

By setting a chip group to these articles, counterfeiting can be prevented. The chip group that is very thin and compact can be used and therefore, the design of a passport, a license card and the like is not spoiled. Moreover, the chip group is light-transmitting, thus it may be set on a surface of an article. In addition, according to the chip group, management of passports, license cards and the like can be simplified. Moreover, data can be stored in a chip group without writing directly in passports, license cards and the like; therefore our privacy can be protected.

A chip group of the present invention may be mounted on an expensive bag, e.g., a designer bag. Consequently, distribution of such forged articles (fakes) can be prevented.

Note that, in FIG. 16B, the chip group 30 having the four thin film integrated circuits 320 sharing one memory 321 is described; however the present invention is not limited thereto. In other words, in the present invention, the number of thin film integrated circuits, memories, and methods for forming a thin film integrated circuit and a memory are not limited.

In FIGS. 16A and 16B, an antenna is not shown; however an antenna shared by plural thin film integrated circuits can be provided or an antenna can be integrated in each thin film integrated circuit. When frequencies received by thin film integrated circuits are different, an antenna is preferably provided for each thin film integrated circuit, since it is preferable that antenna lengths are changed according to the frequencies. At this time, a thin film integrated circuit having a long antenna length may be connected to an antenna formed outside the thin film integrated circuit (an external antenna).

Because a chip group is very thin and small, and can be more flexible, the chip group can be mounted on a sheet-like article. As an example of sheet-like articles, the case of mounting a chip group on a bill is described.

Figure 17:
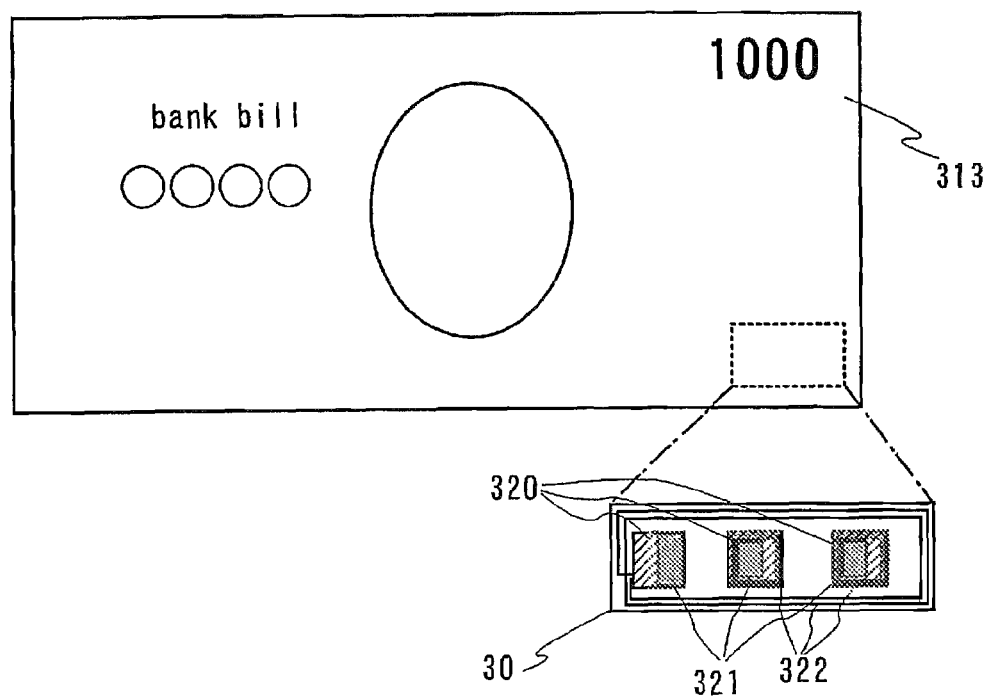
FIG. 17 shows an article provided with thin film integrated circuits.

As shown in FIG. 17, a chip group 30 is mounted on a bill 313. The chip group 30 includes two thin film integrated circuits in which a memory 321 and an antenna 322 are integrated, and one thin film integrated circuit 320 which is connected to an external antenna 322 and in which a memory 321 is integrated. Although the chip group is mounted inside the bill in FIG. 17, it may be exposed on a surface thereof.

The bill may be printed using an ink containing plural chip groups. Further, chip groups may be scattered to form a bill when mixing a material of the bill and chemicals. Since such a chip group, that is, thin film integrated circuits can be formed at a low cost, a plurality of chip groups can be mounted on a bill without adversely affecting the production cost of the bill.

A chip group may be mounted on portfolios such as stock certificates or checks, or coins as well as on bills.

By mounting plural thin film integrated circuits of the present invention, its security such as prevention of falsification of a thin film integrated circuit or information leakage from a thin film integrated circuit can be enhanced. Counterfeiting portfolios or the like can be prevented.

Such a sheet article is frequently bent, therefore, a bending stress applied to a chip group must be taken into consideration. As an example, a state where a bill mounted with a chip group, is bent, is described. Generally, a sheet article easily bends or is easily bent in a longitudinal direction, therefore, the case of bending in a longitudinal direction is described. The a thin film transistor of a thin film integrated circuit of the chip group 30 includes a source region, a channel formation region, and a drain region. When bending an article, it is preferable that the thin film transistor of a thin film integrated circuit of the chip group 30 be disposed so that the bending direction is perpendicular to the direction that carriers move. That is, the source region, the channel formation region, and the drain region are disposed so as to be perpendicular to the bending direction. As a result, the thin film transistor being broken and peeled off by the bending stress can be prevented.

As shown in FIG. 19, in the case of using a crystalline semiconductor film using laser irradiation, the laser scanning direction (X-axis direction) is preferably set perpendicular to the bending direction as well.

By bending a chip group in the bending direction, a thin film integrated circuit of the chip group, in particular, a thin film transistor is not broken and grain boundaries that exist in the direction that carriers move can considerably be decreased. As a result, electronic characteristics, in particular, mobility of the thin film transistor can be improved.

In addition, when a patterned semiconductor film occupies 1 to 30% of an area of the chip group, the thin film transistor being broken and peeled off by the bending stress can be prevented.

Since a material having extensibility can be used for an antenna, a bending direction of the antenna does not necessarily need to be considered, unlike a chip group.

FIG. 17 shows the chip group 30 including two thin film integrated circuits in which memories 321 and antennas 322 are integrated, and one thin film integrated circuit 320 which is connected to an external antenna 322 and in which a memory 321 is integrated. In other words, the number of thin film integrated circuits, memories, and methods for forming a thin film integrated circuit and a memory are not limited.

Figure 18:
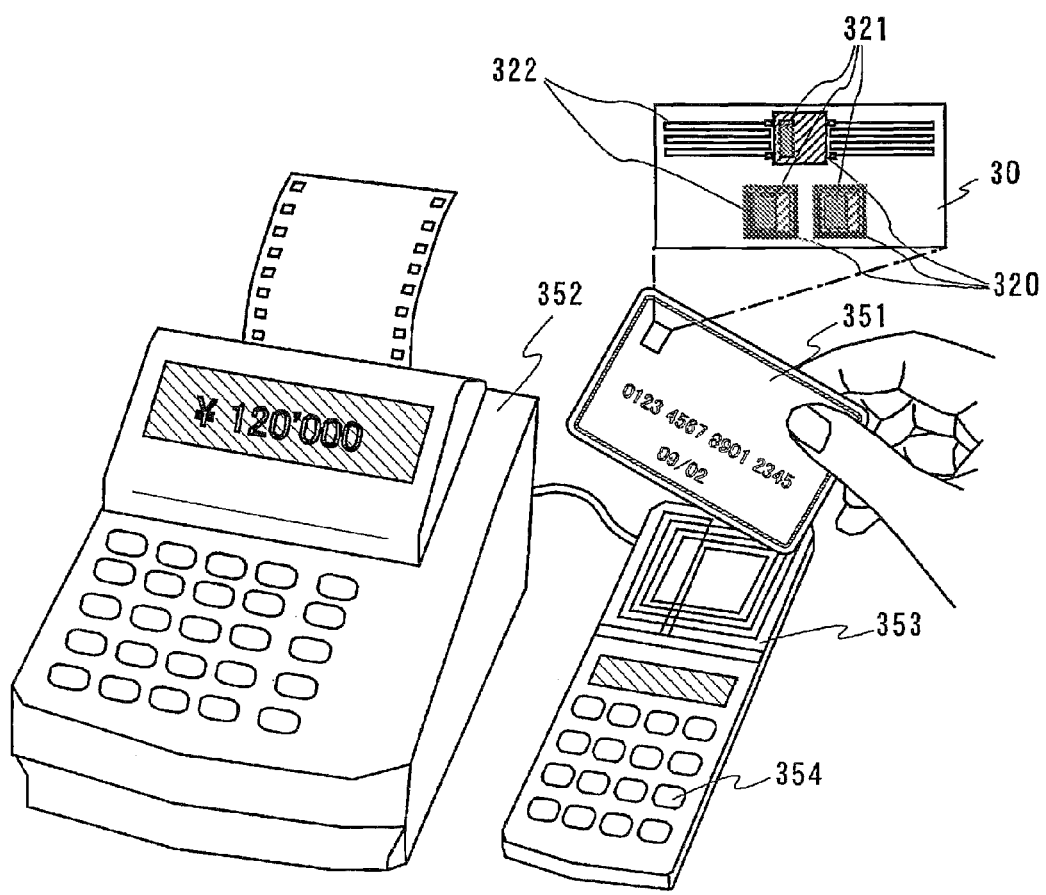
FIG. 18 shows an article provided with thin film integrated circuits.

Described hereinafter is a mode of using an IC card using a contact chip group as electronic money. FIG. 18 shows a mode that a credit card 351 is used to make a payment. The credit card 351 includes a chip group 30. The chip group 30 includes two thin film integrated circuits in which memories 321 and antennas 322 are integrated, and one thin film integrated circuit 320 which is connected to an external antenna 322 and a memory 321 is integrated. A cash register 352 and a reader/writer 353 needed for payment are provided. The chip group 30 stores information on the amount deposited into the credit card 351. The information on the deposited amount can be read and transferred to the cash register 352 without contact by the reader/writer 353. The cash register 352 verifies that the amount on the credit card 351 is more than the amount to be paid for, and thus payment is made. Then, the information of the remaining amount of the money after the payment is transmitted to the reader/writer 353 and can be written in the chip group 30 by the reader/writer 353. In this manner, when the chip group is accessed by the reader/writer, key information is received by plural integrated circuits, thereby enhancing security.

Note that the reader/writer 353 may be equipped, so as to enhance the security, with a key pad 354 for inputting a personal identification number and the like, thereby preventing the credit card 351 from being used to make payment by a third person without permission.

By mounting plural thin film integrated circuits of the present invention on a credit card or the like, its security such as prevention of falsification of a thin film integrated circuit or information leakage from a thin film integrated circuit can be enhanced. Counterfeiting a credit card or the like can be prevented.

EXPLANATION OF REFERENCE

10: memory, 30: chip group, 100: insulating substrate, 101: thin film integrated circuit, 101a: thin film integrated circuit, 101b: thin film integrated circuit, 102: separation layer, 103: TFT layer, 104: region, 105: groove, 106: connection region, 10a: memory, 115: etching agent, 11a: antenna, 121: insulating film, 122: insulating film, 123: insulating film, 124: semiconductor film, 124 (s): source region, 124 (c): channel formation region, 124 (d): drain region, 125: gate insulating film, 127: interlayer insulating film, 128n: thin film transistor, 128n: n-channel thin film transistor, 128p: p-channel thin film transistor, 129: interlayer insulating film, 130: wiring, 131: insulating film, 141: adhesive agent, 142: different base material, 200: base material, 201: antenna, 203: card, 281: movement direction, 282: laser spot, 283: path, 290: laser oscillator, 291: optical system, 293: galvanometer mirror, 294: f θ lens, 295: XY stage, 296: device (control device), 300: antenna, 301a; thin film integrated circuit, 301b: thin film integrated circuit, 301c: thin film integrated circuit, 304: gate circuit, 305: electronic key, 306: control circuit, 307: memory circuit, 307a: memory, 307b: memory, 308: power supply circuit, 311: passport, 312: license card, 313: bill, 320: thin film integrated circuit, 321: memory, 322: antenna, 351: credit card, 352: register 353: reader/writer, 354: key pad

What is claimed is:

1. A semiconductor device comprising:
a first integrated circuit on a surface of a substrate, the first integrated circuit comprising a first semiconductor layer;
a first antenna on the surface, the first antenna electrically connected to the first integrated circuit;
a second integrated circuit on the surface, the second integrated circuit comprising a second semiconductor layer;
a second antenna on the surface, the second antenna electrically connected to the second integrated circuit; and
a third antenna on the surface, the third antenna electrically connected to the second integrated circuit,
wherein the second antenna is arranged inside the first antenna,
wherein the third antenna is arranged inside the first antenna,
wherein the second antenna comprises a first region expanded to a first direction parallel to an edge of the substrate, a second region expanded to a second direction intersecting with the first direction, a third region expanded to the first direction, a fourth region expanded to the second direction, a fifth region expanded to the first direction, a sixth region expanded to the second direction, and a seventh region expanded to the first direction,
wherein the third antenna comprises an eighth region expanded to a third direction parallel to an edge of the substrate, a ninth region expanded to a fourth direction intersecting with the third direction, a tenth region expanded to the third direction, an eleventh region expanded to the fourth direction, a twelfth region expanded to the third direction, a thirteenth region expanded to the fourth direction, and a fourteenth region expanded to the third direction,
wherein one end of the first region is electrically connected to a first terminal of the second integrated circuit,
wherein one end of the seventh region is electrically connected to a second terminal of the second integrated circuit,
wherein the first terminal is electrically connected to the second terminal through the first region, the second region, the third region, the fourth region, the fifth region, the sixth region, and the seventh region in this order,
wherein one end of the eighth region is electrically connected to a third terminal of the second integrated circuit,
wherein one end of the fourteenth region is electrically connected to a fourth terminal of the second integrated circuit,
wherein the third terminal is electrically connected to the fourth terminal through the eighth region, the ninth region, the tenth region, the eleventh region, the twelfth region, the thirteenth region, and the fourteenth region in this order,
wherein a length of each of the first region, the third region, the fifth region, and the seventh region is longer than sum of lengths of the second region, and
wherein a length of each of the eighth region, the tenth region, the twelfth region, and the fourteenth region is longer than sum of lengths of the ninth region, the eleventh region, and the thirteenth region.

2. A semiconductor device according to claim 1, wherein the first integrated circuit is electrically connected to the first antenna by anisotropic conductive resin.

3. A semiconductor device comprising:
a first integrated circuit comprising a first semiconductor layer, and over a substrate;
a second integrated circuit comprising a second semiconductor layer, and over the substrate;
a third integrated circuit comprising a third semiconductor layer, and over the substrate;
a first antenna overlapping with the first integrated circuit;
a second antenna over the substrate;
a third antenna arranged inside the second antenna; and
a fourth antenna arranged inside the second antenna,
wherein the first antenna is arranged inside the second antenna,
wherein the first antenna is electrically connected to the first semiconductor layer,
wherein the second antenna is electrically connected to the second semiconductor layer,
wherein the third antenna is electrically connected to the third semiconductor layer,
wherein the fourth antenna is electrically connected to the third semiconductor layer,
wherein the third antenna comprises a first region expanded to a first direction parallel to an edge of the substrate, a second region expanded to a second direction intersecting with the first direction, a third region expanded to the first direction, a fourth region expanded to the second direction, a fifth region expanded to the first direction, a sixth region expanded to the second direction, and a seventh region expanded to the first direction,
wherein the fourth antenna comprises an eighth region expanded to a third direction parallel to an edge of the substrate, a ninth region expanded to a fourth direction intersecting with the third direction, a tenth region expanded to the third direction, an eleventh region expanded to the fourth direction, a twelfth region expanded to the third direction, a thirteenth region expanded to the fourth direction, and a fourteenth region expanded to the third direction,
wherein one end of the first region is electrically connected to a first terminal of the third integrated circuit,
wherein one end of the seventh region is electrically connected to a second terminal of the third integrated circuit,
wherein the first terminal is electrically connected to the second terminal through the first region, the second region, the third region, the fourth region, the fifth region, the sixth region, and the seventh region in this order,
wherein one end of the eighth region is electrically connected to a third terminal of the third integrated circuit,
wherein one end of the fourteenth region is electrically connected to a fourth terminal of the third integrated circuit,
wherein the third terminal is electrically connected to the fourth terminal through the eighth region, the ninth region, the tenth region, the eleventh region, the twelfth region, the thirteenth region, and the fourteenth region in this order,
wherein a length of each of the first region, the third region, the fifth region, and the seventh region is longer than sum of lengths of the second region, the fourth region, and the seventh region, and
wherein a length of each of the eighth region, the tenth region, the twelfth region, and the fourteenth region is longer than sum of lengths of the ninth region, the eleventh region, and the thirteenth region.

4. A semiconductor device according to claim 3,
wherein the first integrated circuit is mounted on the substrate by an adhesive agent, and
wherein the second integrated circuit is electrically connected to the second antenna by anisotropic conductive resin.

5. A semiconductor device comprising:
an integrated circuit comprising a semiconductor layer, and over a substrate;
a first antenna is electrically connected to the semiconductor layer; and
a second antenna is electrically connected to the semiconductor layer,
wherein the first antenna comprises a first region expanded to a first direction parallel to an edge of the substrate, a second region expanded to a second direction intersecting with the first direction, a third region expanded to the first direction, a fourth region expanded to the second direction, a fifth region expanded to the first direction, a sixth region expanded to the second direction, and a seventh region expanded to the first direction,
wherein the second antenna comprises an eighth region expanded to a third direction parallel to an edge of the substrate, a ninth region expanded to a fourth direction intersecting with the third direction, a tenth region expanded to the third direction, an eleventh region expanded to the fourth direction, a twelfth region expanded to the third direction, a thirteenth region expanded to the fourth direction, and a fourteenth region expanded to the third direction,
wherein one end of the first region is electrically connected to a first terminal of the integrated circuit,
wherein one end of the seventh region is electrically connected to a second terminal of the integrated circuit,
wherein the first terminal is electrically connected to the second terminal through the first region, the second region, the third region, the fourth region, the fifth region, the sixth region, and the seventh region in this order,
wherein one end of the eighth region is electrically connected to a third terminal of the integrated circuit,
wherein one end of the fourteenth region is electrically connected to a fourth terminal of the integrated circuit,
wherein the third terminal is electrically connected to the fourth terminal through the eighth region, the ninth region, the tenth region, the eleventh region, the twelfth region, the thirteenth region, and the fourteenth region in this order,
wherein a length of each of the first region, the third region, the fifth region, and the seventh region is longer than sum of lengths of the second region, the fourth region, and the seventh region, and
wherein a length of each of the eighth region, the tenth region, the twelfth region, and the fourteenth region is longer than sum of lengths of the ninth region, the eleventh region, and the thirteenth region.

* * * * *